US012703069B2

(12) United States Patent
Tibbs et al.

(10) Patent No.: US 12,703,069 B2
(45) Date of Patent: Aug. 11, 2026

(54) TOOL WITH PIVOTING PORTION AND LOCKING MECHANISM

(71) Applicant: Milwaukee Electric Tool Corporation, Brookfield, WI (US)

(72) Inventors: Parker E. Tibbs, Milwaukee, WI (US); Devin W. Herritz, Sussex, WI (US); Brandon A. Apostal, Gurnee, IL (US)

(73) Assignee: Milwaukee Electronic Tool Corporation, Brookfield, WI (US)

( * ) Notice: Subject to any disclaimer, the term of this patent is extended or adjusted under 35 U.S.C. 154(b) by 368 days.

(21) Appl. No.: 18/360,585

(22) Filed: Jul. 27, 2023

(65) Prior Publication Data

US 2024/0075596 A1 Mar. 7, 2024

Related U.S. Application Data

(60) Provisional application No. 63/374,660, filed on Sep. 6, 2022, provisional application No. 63/384,823, filed on Nov. 23, 2022.

(51) Int. Cl.

| | |
|---|---|
| ***B25B 23/00*** | (2006.01) |
| ***B25B 13/46*** | (2006.01) |
| ***B25B 13/48*** | (2006.01) |

(52) U.S. Cl.
CPC ........ *B25B 23/0028* (2013.01); *B25B 13/463* (2013.01); *B25B 13/481* (2013.01)

(58) Field of Classification Search
CPC .................................................. B25B 23/0028
USPC ............................................. 81/177.8, 177.9
See application file for complete search history.

(56) References Cited

U.S. PATENT DOCUMENTS

| | | | | |
|---|---|---|---|---|
| 207,709 | A * | 9/1878 | Brett | B25B 13/14 81/177.8 |
| 4,901,608 | A | 2/1990 | Shieh | |
| 5,199,335 | A | 4/1993 | Arnold et al. | |
| 5,515,754 | A * | 5/1996 | Elkins | B25G 1/066 81/177.9 |
| 6,000,302 | A | 12/1999 | Chiang | |
| 6,148,698 | A | 11/2000 | Hsieh | |
| 6,186,034 | B1 | 2/2001 | Lamons | |
| 6,220,125 | B1 | 4/2001 | Lan | |
| 6,405,620 | B2 | 6/2002 | Liao | |

(Continued)

FOREIGN PATENT DOCUMENTS

| | | |
|---|---|---|
| CN | 2738957 | 11/2005 |
| CN | 203495841 | 3/2014 |

(Continued)

*Primary Examiner* — Hadi Shakeri
(74) *Attorney, Agent, or Firm* — Reinhart Boerner Van Deuren s.c.

(57) ABSTRACT

A tool with a pivoting head is shown. The tool includes a locking mechanism that allows the angular position of the head to be locked securely in place once selected by a user. In a specific embodiment, the locking mechanism includes a locking channel positioned in a generally parallel orientation to the axis of rotation of the pivoting head. In a specific embodiment, the locking mechanism includes a biasing component positioned in a generally parallel orientation to the axis of rotation of the pivoting head. The locking mechanism may be used with a variety of tools, such as ratchet wrenches, that allow for repositioning of the head relative to the handle of the tool.

19 Claims, 23 Drawing Sheets

(56) References Cited

U.S. PATENT DOCUMENTS

| | | | |
|---|---|---|---|
| 6,405,621 B1 | 6/2002 | Krivec et al. | |
| 6,840,141 B2 | 1/2005 | Cole | |
| 6,871,569 B1 | 3/2005 | Chen | |
| 6,895,839 B1 | 5/2005 | Hsien | |
| 6,957,600 B2 | 10/2005 | Hu | |
| 7,131,356 B2 | 11/2006 | Lin | |
| 7,156,003 B2 | 1/2007 | Cole | |
| 7,174,815 B1 * | 2/2007 | Hsieh | F16C 11/10 81/177.8 |
| 7,481,135 B2 | 1/2009 | Schoenbeck et al. | |
| 7,878,091 B2 | 2/2011 | Abel et al. | |
| 7,992,471 B2 * | 8/2011 | Tsai | B25B 13/461 81/177.9 |
| 8,505,419 B2 * | 8/2013 | Cheng | B25G 1/063 81/177.85 |
| 9,073,199 B2 | 7/2015 | Hsieh | |
| 9,302,373 B2 | 4/2016 | Johnson | |
| 9,511,485 B2 | 12/2016 | Chang | |
| 9,808,917 B1 | 11/2017 | Chien | |
| 10,131,038 B2 | 11/2018 | Chien | |
| 10,252,403 B2 | 4/2019 | Chen | |
| 10,335,932 B2 * | 7/2019 | Wang | B25B 23/0028 |
| 10,532,448 B2 | 1/2020 | Huddy | |
| 10,717,174 B2 | 7/2020 | Chien | |
| 10,953,523 B2 | 3/2021 | Lai | |
| 11,135,707 B2 | 10/2021 | Hersh | |
| 11,298,806 B2 | 4/2022 | Huddy | |
| 2003/0015070 A1 | 1/2003 | Chen | |
| 2004/0103765 A1 | 6/2004 | Chang | |
| 2004/0177731 A1 | 9/2004 | Chen | |
| 2008/0289453 A1 | 11/2008 | Robinson et al. | |
| 2009/0090223 A1 | 4/2009 | Wu | |
| 2011/0226099 A1 | 9/2011 | Chen | |
| 2013/0025417 A1 | 1/2013 | Tsai | |
| 2013/0269491 A1 | 10/2013 | Chang | |
| 2013/0305887 A1 | 11/2013 | Lai | |
| 2016/0361801 A1 | 12/2016 | Wang | |
| 2017/0190029 A1 | 7/2017 | Cuesta | |
| 2022/0024005 A1 | 1/2022 | Hersh | |

FOREIGN PATENT DOCUMENTS

| | | |
|---|---|---|
| CN | 106181844 | 12/2016 |
| CN | 107511783 | 12/2017 |
| DE | 19819457 | 9/1999 |
| DE | 202004013978 | 1/2005 |
| DE | 202009007637 | 8/2009 |
| DE | 202016107481 | 3/2017 |
| EP | 0027238 | 4/1981 |
| EP | 1547727 | 6/2005 |
| EP | 1637286 | 12/2007 |
| EP | 1958736 | 8/2008 |
| WO | WO2016081543 | 5/2016 |
| WO | WO22160172 | 8/2022 |

* cited by examiner

TOOL WITH PIVOTING PORTION AND LOCKING MECHANISM

CROSS-REFERENCE TO RELATED PATENT APPLICATIONS

The present application claims the benefit of and priority to U.S. Provisional Application No. 63/384,823, filed Nov. 23, 2022, and to U.S. Provisional Application No. 63/374,660, filed Sep. 6, 2022, which are incorporated herein by reference in their entireties.

BACKGROUND OF THE INVENTION

The present invention relates generally to the field of tools. The present invention relates specifically to a tool, such as a ratcheting wrench, with a pivoting head.

SUMMARY OF THE INVENTION

One embodiment of the invention relates to a driving tool. The driving tool includes a handle, a head, a workpiece engagement structure, and a ratchet mechanism. The handle includes a first flange, a second flange, and a cavity positioned between the first flange and the second flange. The head includes a toothed projection extending toward the handle. The workpiece engagement structure is coupled to the head. The ratchet mechanism is supported by the head and coupled to the workpiece engagement structure. The tool further includes a pivot joint positioned between the handle and the head. The pivot joint includes an axle extending along a pivot axis. The axle rotatably couples the head to the handle such that the head is pivotable about the pivot joint to a plurality of angular positions relative to the handle. The tool further includes a locking mechanism positioned within a cavity in the handle. The locking mechanism includes a sliding switch positioned within the cavity. The sliding switch includes an actuating surface extending outward from the handle and configured to be engaged by a user's finger. The sliding switch further includes a plurality of teeth facing the toothed projection of the head. The locking mechanism further includes a biasing component and a ball. The biasing component extends in a generally parallel orientation to the pivot axis and resists movement of the sliding switch. The ball is positioned between the biasing component and an inward facing surface of the handle. The locking mechanism is moveable between a locked position in which the angular position of the head relative to the handle is fixed and an unlocked position in which the head is pivotable about the axis of rotation.

Another embodiment of the invention relates to a driving tool. The driving tool includes a handle, a head, and a workpiece engagement structure. The handle includes a first flange, a second flange, and a cavity positioned between the first flange and the second flange. The head includes a toothed projection extending toward the handle. The workpiece engagement structure is coupled to the head. The driving tool further includes a pivot joint positioned between the handle and the head such that the head is pivotable about the pivot joint to a plurality of angular positions relative to the handle. A pivot axis extends through the pivot joint and is generally perpendicular to a longitudinal axis of the handle. The driving tool further includes a locking mechanism positioned within the cavity. The locking mechanism includes a switch positioned within the cavity. The switch includes a first actuator extending outward from the handle and configured to be engaged by a user's finger and a plurality of teeth facing the toothed projection of the head. The locking mechanism further includes a biasing component and a ball. The biasing component extends in a generally perpendicular orientation to the longitudinal axis of the handle the pivot axis and resists movement of the switch. The ball is positioned between the biasing component and an inward facing surface of the handle. When the switch is actuated, the switch is translated along the longitudinal axis of the handle. when the switch is actuated toward the head, the biasing component is compressed such that the switch is moveable until the plurality of teeth engage the toothed projection of the head.

Another embodiment of the invention relates to a driving tool. The driving tool includes a handle, a head, and a workpiece engagement structure. The handle includes a first flange, a second flange, and a cavity positioned between the first flange and the second flange. The head includes a toothed projection extending toward the handle. The workpiece engagement structure is coupled to the head. The driving tool further includes a pivot joint positioned between the handle and the head to rotatably coupled the handle to the head such that the head is pivotable about the pivot joint to a plurality of angular positions relative to the handle. A pivot axis extends through the pivot joint and is generally perpendicular to a longitudinal axis of the handle. The driving tool further includes a locking mechanism that includes a switch. The switch includes an actuator extends outward from the handle and is configured to be engaged by a user's finger. The switch further includes a body portion coupled to the actuator. The body portion includes an upward facing surface that faces toward the head, a downward facing surface that faces toward the handle, and a plurality of teeth on the upward facing surface of the body. The plurality of teeth extend toward the toothed projection of the head. The body portion further includes a locking channel that extends in a generally parallel orientation to the pivot axis. The driving tool further includes a biasing component and a ball. The biasing component is configured to resist movement of the switch. The ball is positioned between the biasing component and an inward facing surface of the handle. When the switch is actuated, the switch is translated along the longitudinal axis of the handle.

Another embodiment relates to a driving tool. The tool includes a head, a handle, a workpiece engagement structure, and a ratchet mechanism. The workpiece engagement structure is coupled to the head. The ratchet mechanism is supported by the head and coupled to the workpiece engagement structure. The tool further includes a pivot joint positioned between the handle and the head and coupling the head to the body such that head is rotatable about the pivot joint to a plurality of angular positions relative to the handle. The tool further includes a locking mechanism that extends along an axis of rotation of the head. The locking mechanism includes a pin coupling the head to the handle, the pin including an engagement portion and a biasing element that engages the pin and biases the pin along the axis of rotation. The locking mechanism is moveable between a locked position in which the biasing element pushes the engagement portion of the pin into engagement with the head such that the angular position of the head is fixed relative to the body and an unlocked position in which the head is pivotable relative to the body. The pin translates along the axis of rotation into and out of the locked position.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments, and together with the description serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a tool with a pivoting head and locking mechanism are shown. As discussed in detail below, Applicant has designed a locking mechanism for a tool with a pivoting head that provides for robust locking operating, increased adjustability in tight spaces and decreased complexity (i.e., fewer components are necessary). In contrast to the tool with a pivoting head discussed herein, tools with pivoting heads typically include locking mechanisms positioned on and/or within the body of the tool. In small or tight spaces this means a user may have difficulty unlocking and pivoting the head and/or handle to use the tool. The design discussed here includes a locking mechanism positioned along an axis of rotation of the pivoting portion of the tool allowing for use in more confined work environments.

Figure 1:
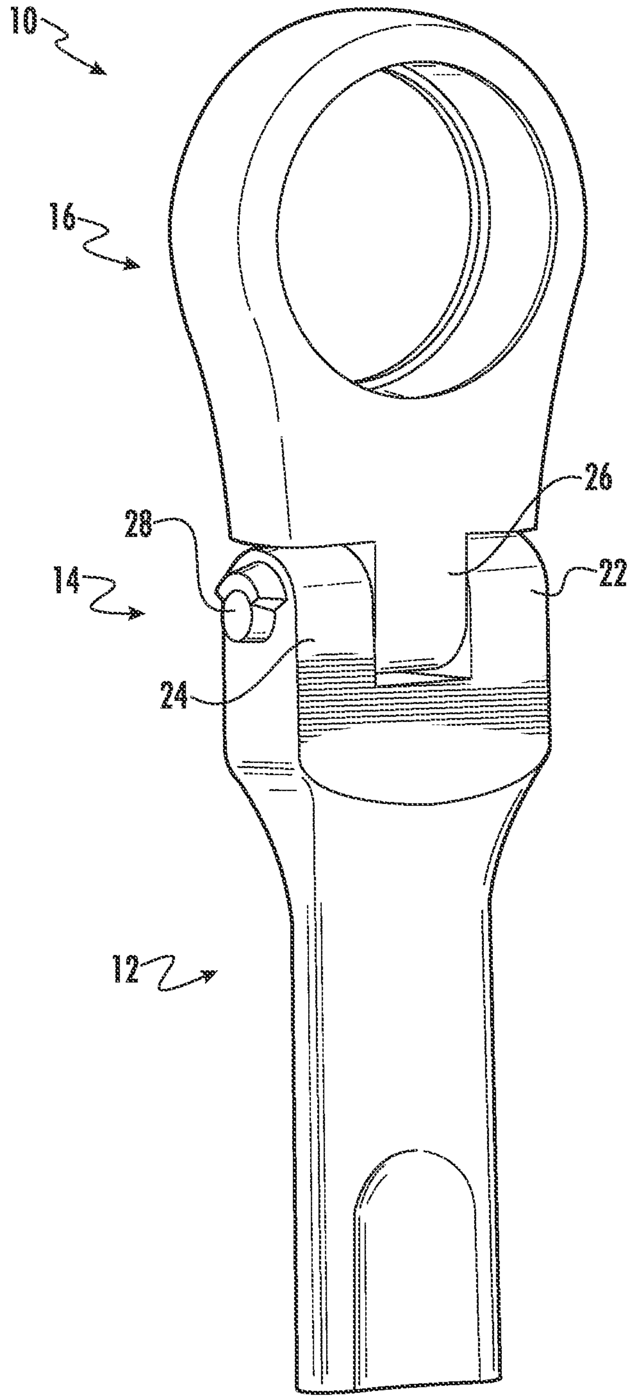
FIG. 1 is a perspective view of a ratchet wrench with a pivoting head, according to an exemplary embodiment.

Referring to FIG. 1, a tool, such as wrench 10, is shown according to an exemplary embodiment. In the embodiment shown, wrench 10 is a ratchet wrench including a tool body or handle 12, a pivot joint 14 and a pivoting portion, shown as head 16. In general, pivot joint 14 is located between handle 12 and head 16 and allows the user to change the angular position of head 16 relative to handle 12.

As will be understood, head 16 includes a workpiece engagement structure 18 (see e.g., FIG. 2) and a ratchet mechanism 20. In general workpiece engagement structure 18 may be any structure that allows for engagement of a workpiece (e.g., a fastener, a bolt, a nut, etc.), and handle 12 acts as a handle and a lever to apply torque to the workpiece. In specific embodiments, workpiece engagement structure

18 is an open wrench head. In other embodiments, workpiece engagement structure 18 is a variety of other torque applying workpiece engagement structures, such as a screw driver head, a post configured to releasably engage a socket, a closed wrench head, etc.

As will be generally understood, ratchet mechanism 20 is supported within head 16, and coupled to workpiece engagement structure 18 such that ratchet mechanism 20 provides ratcheting action to workpiece engagement structure 18. In general, ratchet mechanism 20 is a mechanical structure that allows for free or unrestricted rotation of handle 12 around workpiece engagement structure 18 in a first direction and allows for restricted or driving rotation of handle 12 around workpiece engagement structure 18 in a second direction opposite of the first direction. Wrench 10 may include a selection mechanism that allows the user to select which rotational direction provides driving rotation and which provides free rotation. In a specific embodiment, ratchet mechanism 20 includes a gear structure, one or more pawls and a biasing component.

Figure 2:
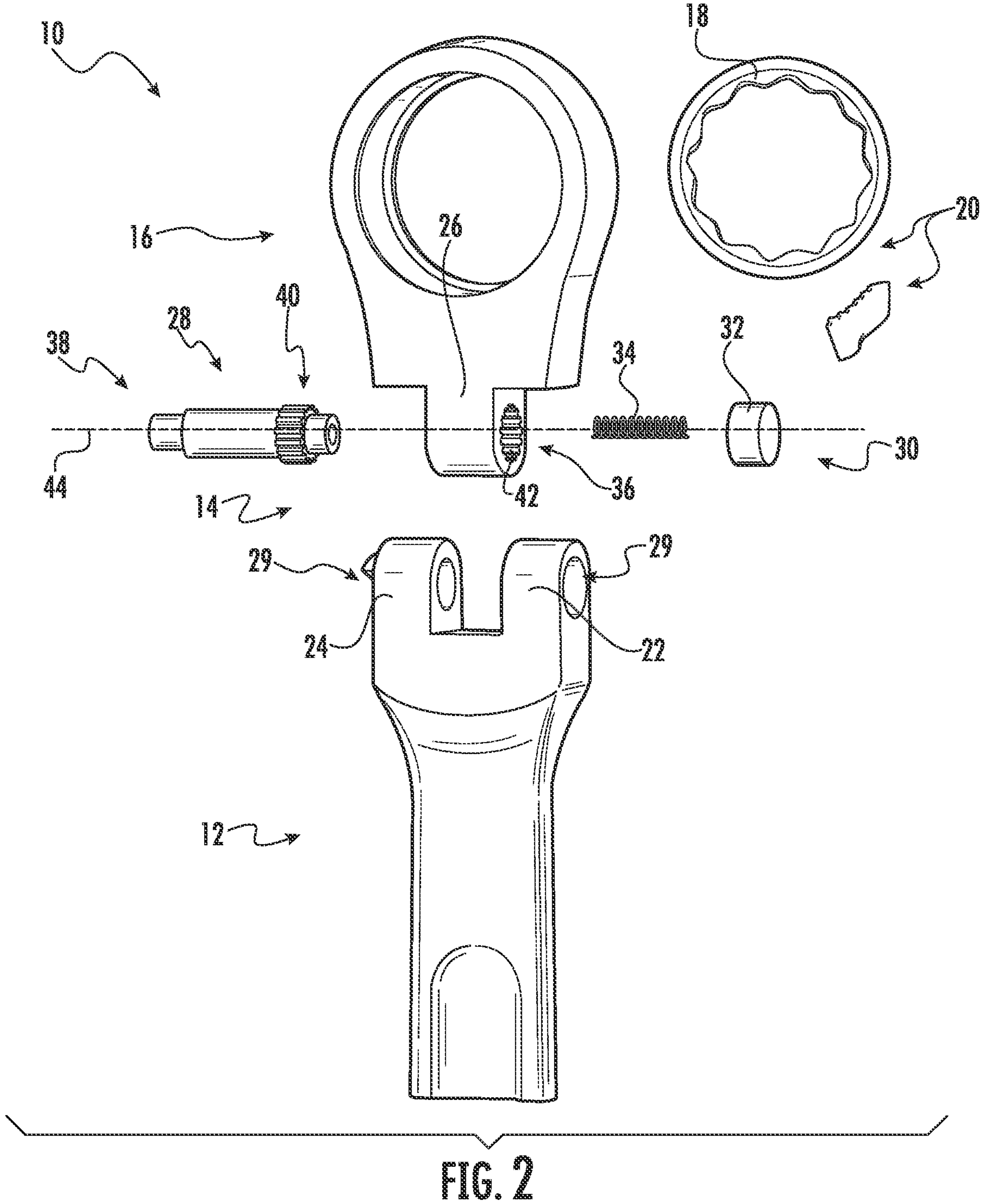
FIG. 2 is an exploded view of the ratchet wrench with the pivoting head of FIG. 1, according to an exemplary embodiment.

Referring to FIG. 1 and FIG. 2, wrench 10 includes a pivot joint 14 that allows the user to adjust the angular position of head 16 relative to handle 12. Wrench 10 includes flanges or arms 22 and 24 located at an engagement end of handle 12 positioned proximate or adjacent to head 16. Head 16 includes a projection 26 that is positioned between arms 22 and 24. An axle or pin 28 extends through openings 29 through arms 22 and 24 and through projection 26 such that pin 28 rotatably couples head 16 to handle 12.

Wrench 10 includes a locking mechanism 30 that allows the user to selectably and reversibly lock head 16 in a desired angular position relative to the handle 12. Locking mechanism 30 is moveable between a locked position in which the angular position of head 16 relative to handle 12 is fixed and an unlocked position in which head 16 is pivotable about pivot joint 14.

In general, locking mechanism 30 includes an end portion, shown as end cap 32, a biasing component, shown as spring 34, a channel 36 extending through projection 26 and pin 28. In general, when a user moves and/or pushes an actuating end 38 of pin 28, a portion of pin 28 including external engagement features, shown as teeth or splines 40 that engage cooperating features, shown as grooves 42 of channel 36 and/or arm 22 move to an unlocked position. In the unlocked position, splines 40 disengage from the grooves 42 of channel 36 of head 16, allowing head 16 to freely pivot about pin 28. Then, when a user releases actuating end 38 of pin 28 spring 34 pushes and/or actuates pin 28 back into to a locked position. In the locked positioned splines 40 engage the grooves 42 of channel 36 and/or arm 22 of handle 12, locking head 16 in the desired angular position.

In another specific embodiment, the locking features may be different from splines (i.e., projections). In a specific embodiment, the pin 28 and splines 40 are integrally formed from one piece of material. In another specific embodiment, the pin 28 and splines 40 are integrally formed from one piece of metal material.

Locking mechanism 30 and specifically pin 28 is positioned and extends along a pivot axis or axis of rotation 44. Head 16 pivots about axis of rotation 44. The pin 28 translates and/or moves along the axis of rotation 44 into and out of the locked position and as such, the axis of translation is the same as the axis of rotation 44. In a specific embodiment, splines 40 are radially symmetric about the axis of rotation 44. As previously discussed, Applicant believes positioning the locking mechanism along the axis of rotation allows for a robust locking mechanism with reduced complexity that has improved functioning in tight spaces because the position allows for actuating the button and/or end of pin 28 and adjusting the tool head angle with limited movement of a user's hand.

Figure 3:
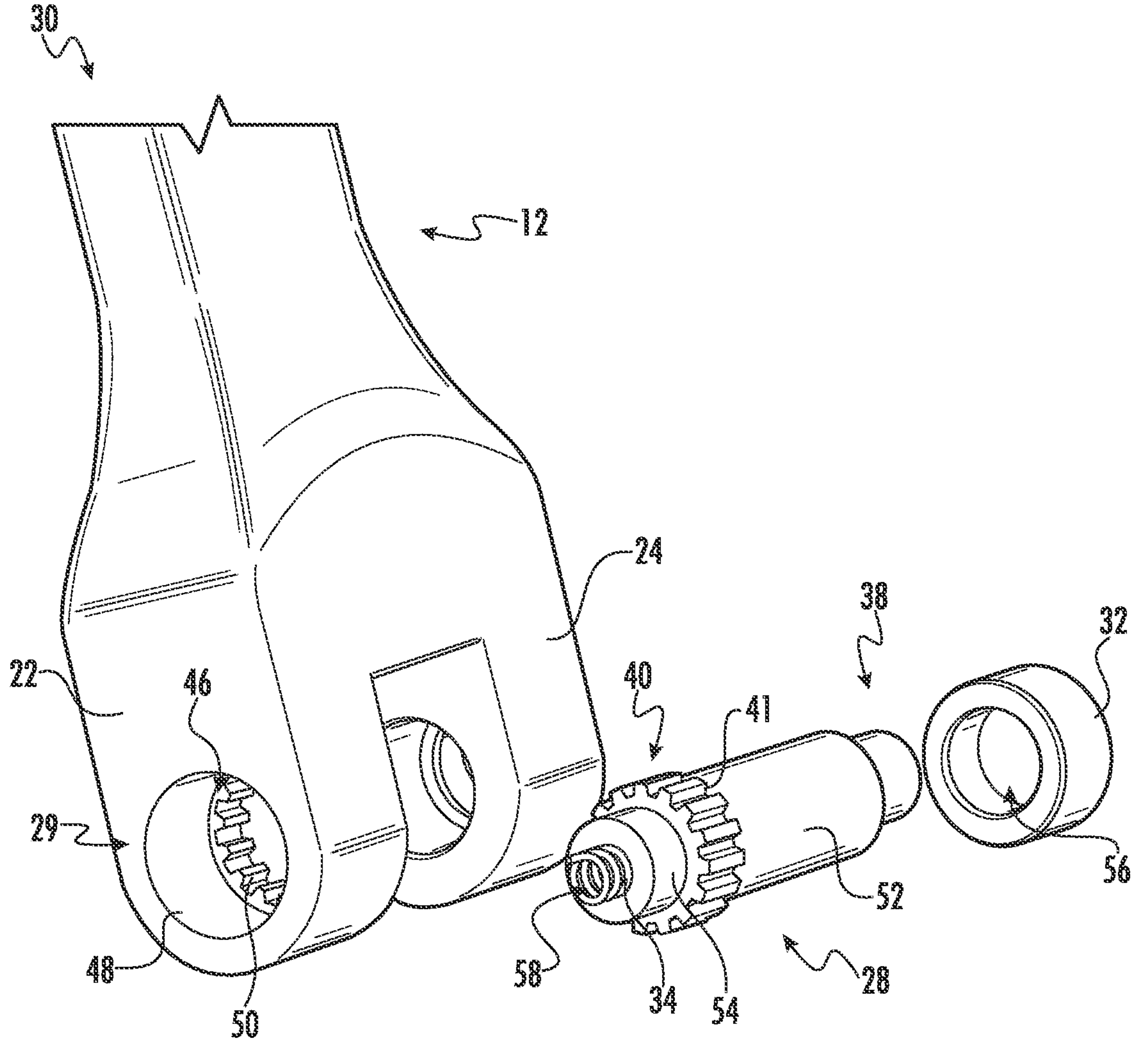
FIG. 3 is a partially exploded view of the ratchet wrench of FIG. 1 with the pivoting head removed, according to an exemplary embodiment.

Referring to FIG. 3, a partially exploded perspective view of locking mechanism 30 with head 16 removed is shown, according to an exemplary embodiment. A channel 46 extends between opposing openings 29 of the engagement end of handle 12 through arms 22 and 24. An outer portion 48 of channel 46 in arm 22 is configured to receive end cap 32. An inner portion (i.e., adjacent to projection 26 when wrench 10 is assembled) of channel 46 includes cooperating features, shown as grooves 50.

Pin 28 includes a pivot portion 52 positioned between actuating end 38 and splines 40. Pin 28 further includes a biasing end 54 opposing actuating end 38. When wrench 10 and specifically locking mechanism 30 is assembled, biasing end 54 of pin 28 is received with an internally facing (i.e., toward projection 26 and grooves 50) recess 56 of end cap 32. Biasing end 54 of pin 28 includes a channel 58. Channel 58 is configured to receive spring 34 and extends past splines 40 into the pivot portion 52 of pin 28 (see e.g., FIG. 5).

In various specific embodiments, the engagement portion of pin 28 including an outermost surface with splines 40 has a greater dimension (i.e., distance from axis of rotation 44 to outermost surface) than an outer dimension of the pivot portion 52. In a specific embodiment, the outer dimension of pivot portion 52 is greater than an outer dimension of biasing end 54 and the outer dimension of biasing end 54 is greater than an outer dimension of actuating end 38 of pin 28. In a specific embodiment, the dimension is a diameter.

Figure 4:
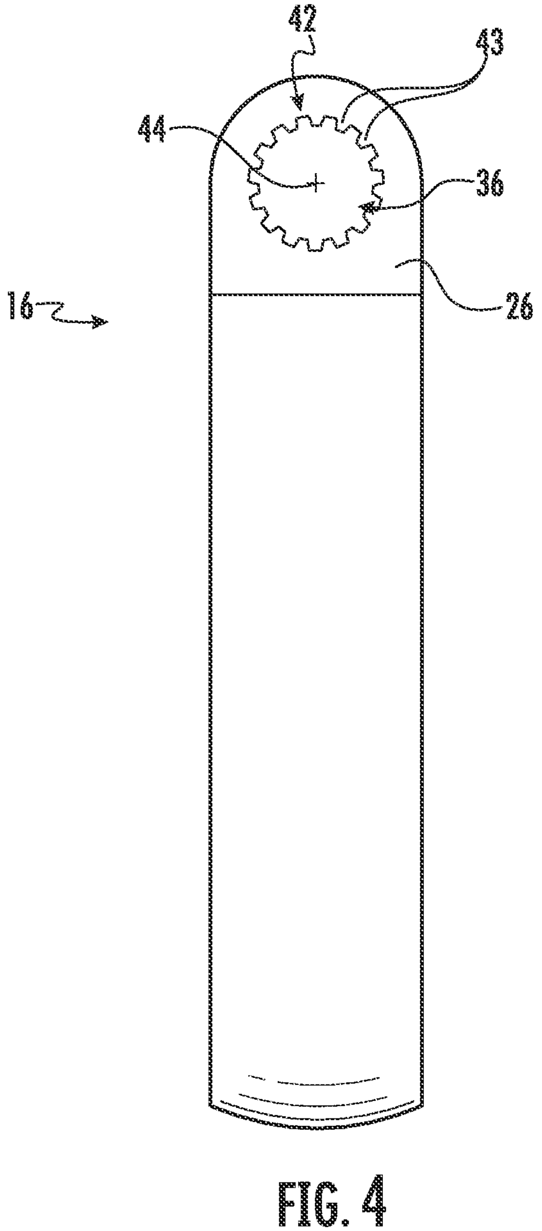
FIG. 4 is side plan view of the pivoting head of the ratchet wrench or FIG. 1, according to an exemplary embodiment.

Referring to FIG. 4, a side plan view of head 16 is shown according to an exemplary embodiment. Channel 36 extends through projection 26 of head 16 along the axis of rotation 44. Channel 36 includes engagement features, shown as teeth or splines 43 configured to engage cooperating features, shown as grooves 41 on pin 28 (see e.g., FIG. 3). Splines 43 of channel 36 extend inward from head 16 toward axis of rotation 44.

Figure 5:
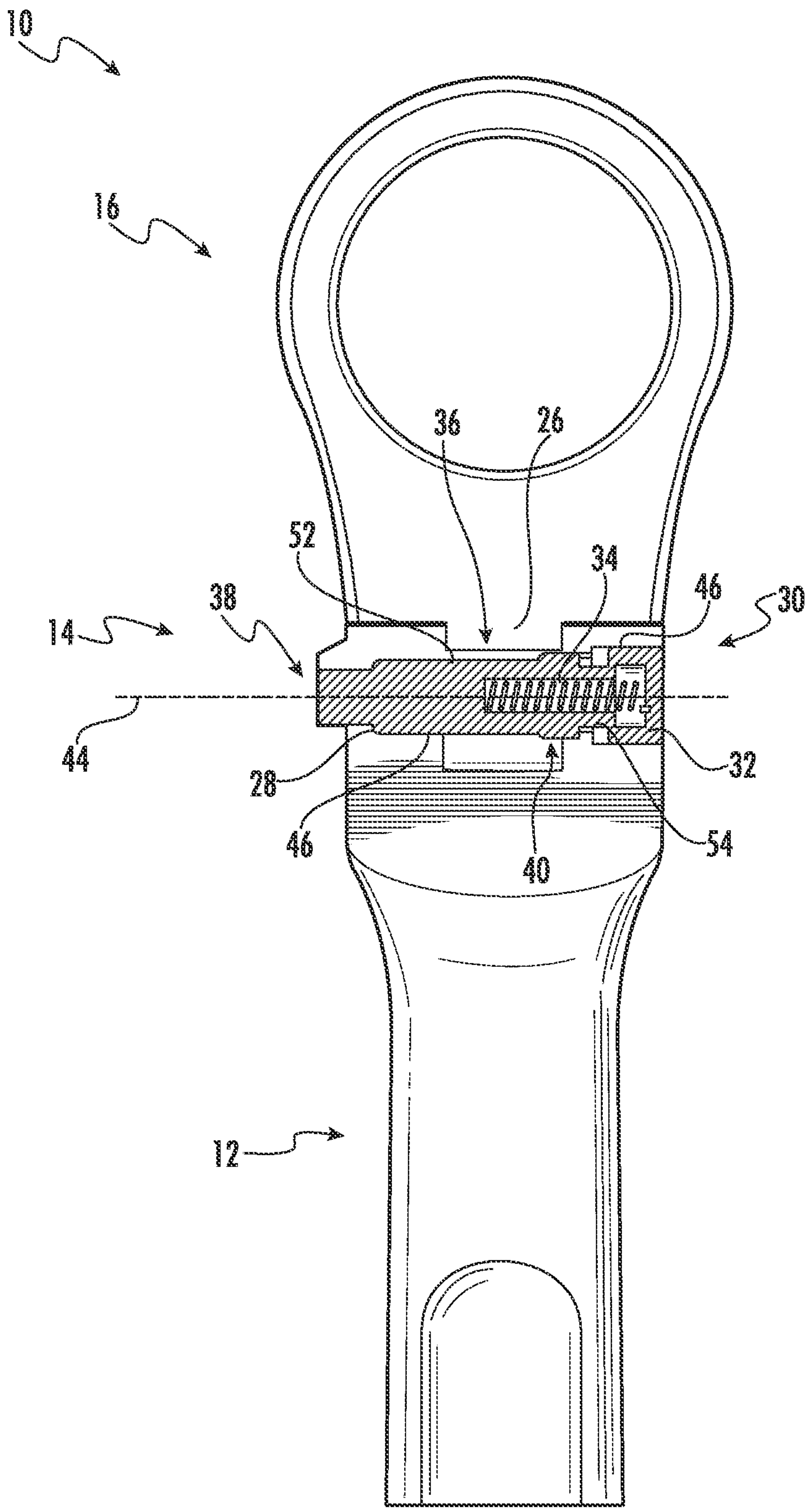
FIG. 5 is a cross-sectional view of the ratchet wrench with the pivoting head of FIG. 1 with a locking mechanism in a locked position, according to an exemplary embodiment.

Referring to FIG. 5, a cross-sectional view of wrench 10 is shown with locking mechanism 30 in a locked position, according to an exemplary embodiment. As shown in FIG. 5, when locking mechanism 30 is in the locked position, splines 40 are engaged with grooves 42 of projection 26 such that head 16 is not pivotable and/or rotatable and spring 34 is in an uncompressed state.

Figure 6:
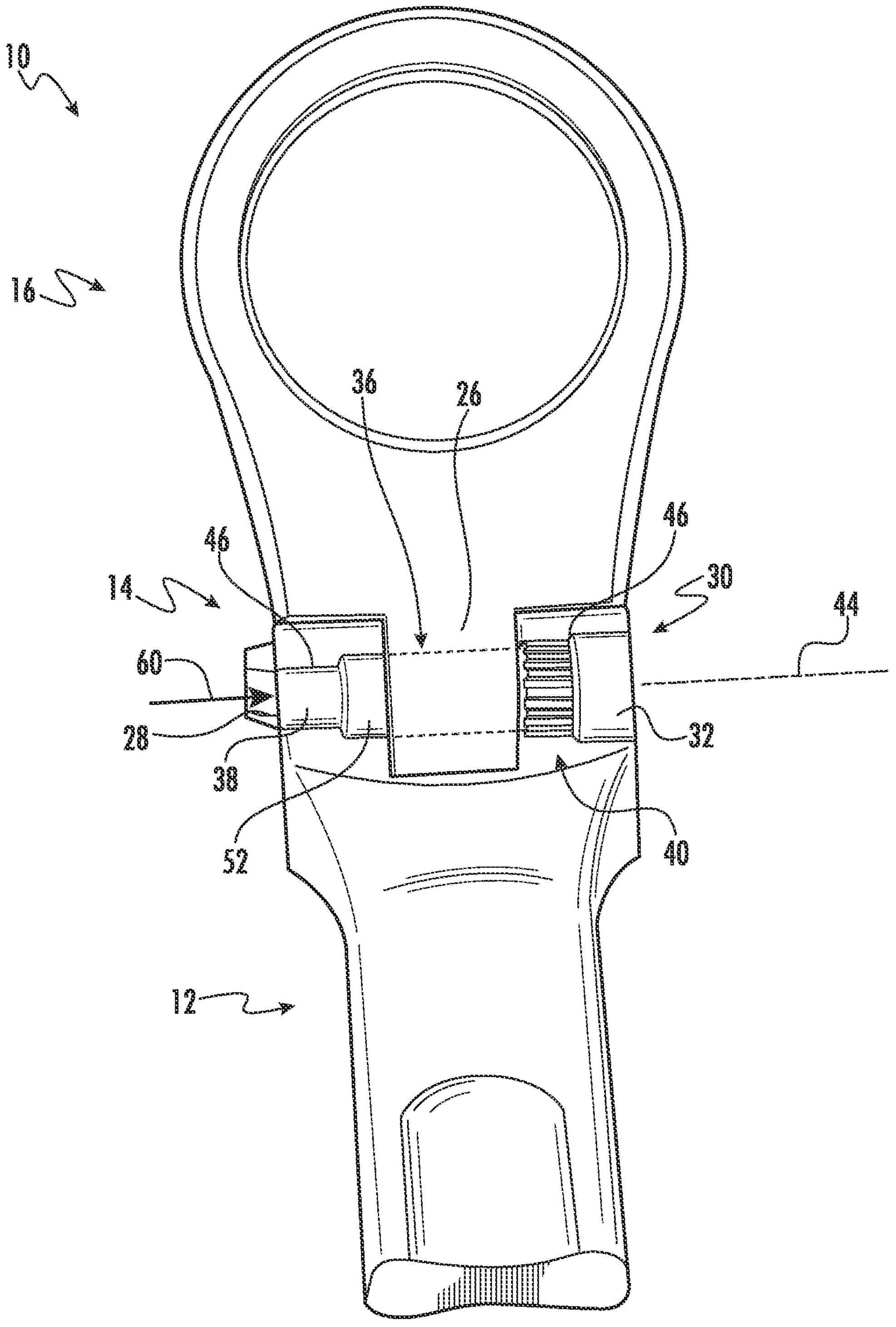
FIG. 6 is a perspective view of the locking mechanism of the ratchet wrench of FIG. 1 in an unlocked position, according to an exemplary embodiment.
Figure 7:
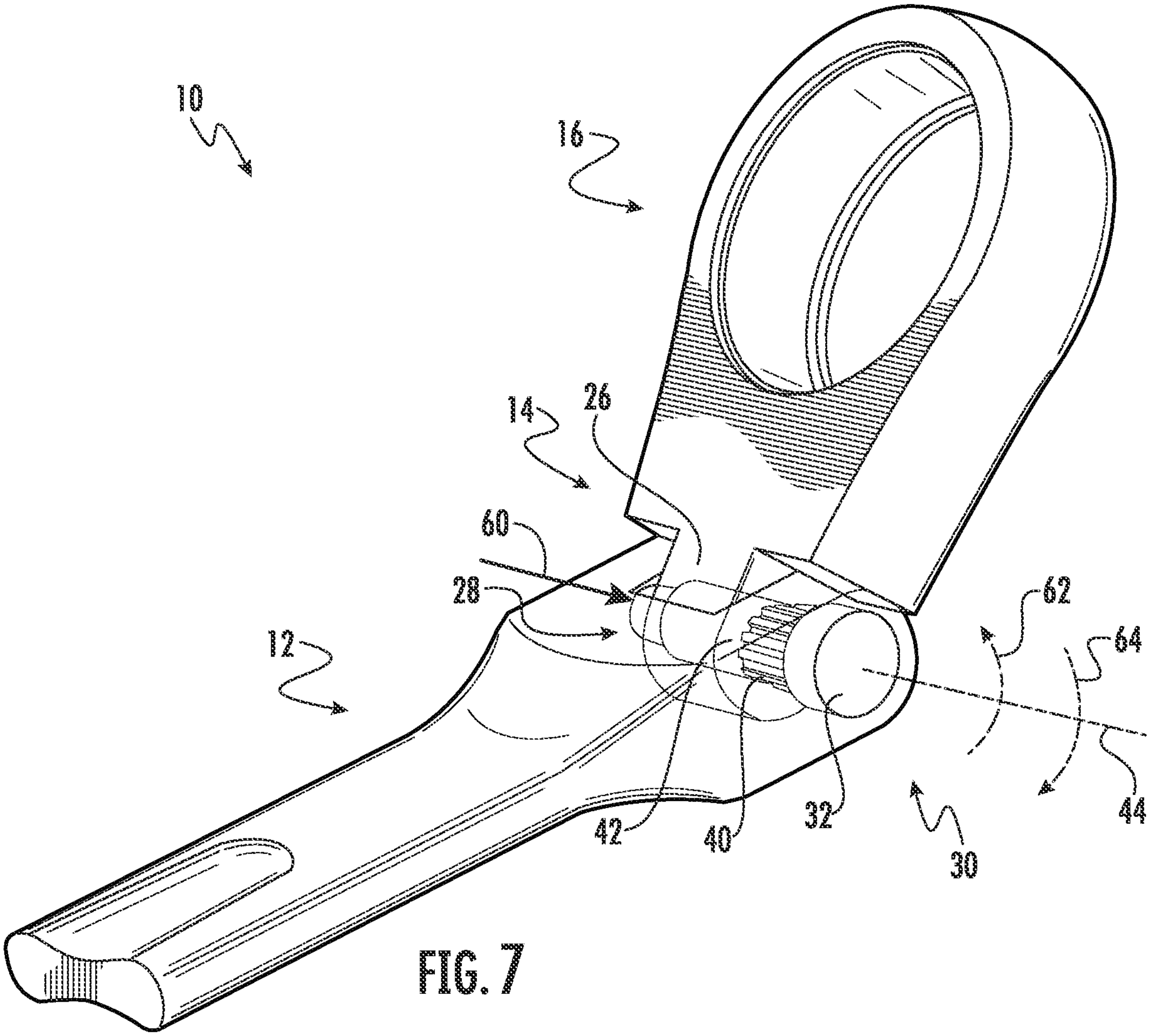
FIG. 7 is a side perspective view of the locking mechanism of the ratchet wrench of FIG. 1 in the unlocked position with the head pivoted, according to an exemplary embodiment.

Referring to FIGS. 6-7, perspective views of wrench 10 are shown with locking mechanism 30 in an unlocked position, according to an exemplary embodiment. When a user pushes actuating end 38 of pin 28 a force is provided as shown by arrow 60. The splines 40 disengage from the grooves 42 of projection 26 and grooves 50 of arm 22 and the space between pin 28 and end cap 32 is decreased. In such a position, spring 34 is compressed within channel 58. With pivot portion 52 positioned within channel 36 of projection 26, pivot portion 52 is rotatable within projection 26 such that head 16 is pivotable about axis of rotation 44.

Referring to FIG. 7, a side perspective view of the locking mechanism 30 of the wrench 10 in the unlocked position with the head 16 pivoted is shown according to an exemplary embodiment. Ratchet head 16 has been pivoted in a counterclockwise direction shown by arrow 62 such that the angle between head 16 and handle 12 has been reduced. Head 16 can similarly be pivoted in a clockwise direction, shown by arrow 64 such that the angle between head 16 and handle 12 is increased. In a specific embodiment, head 16 is pivotable relative to handle 12.

Figure 8:
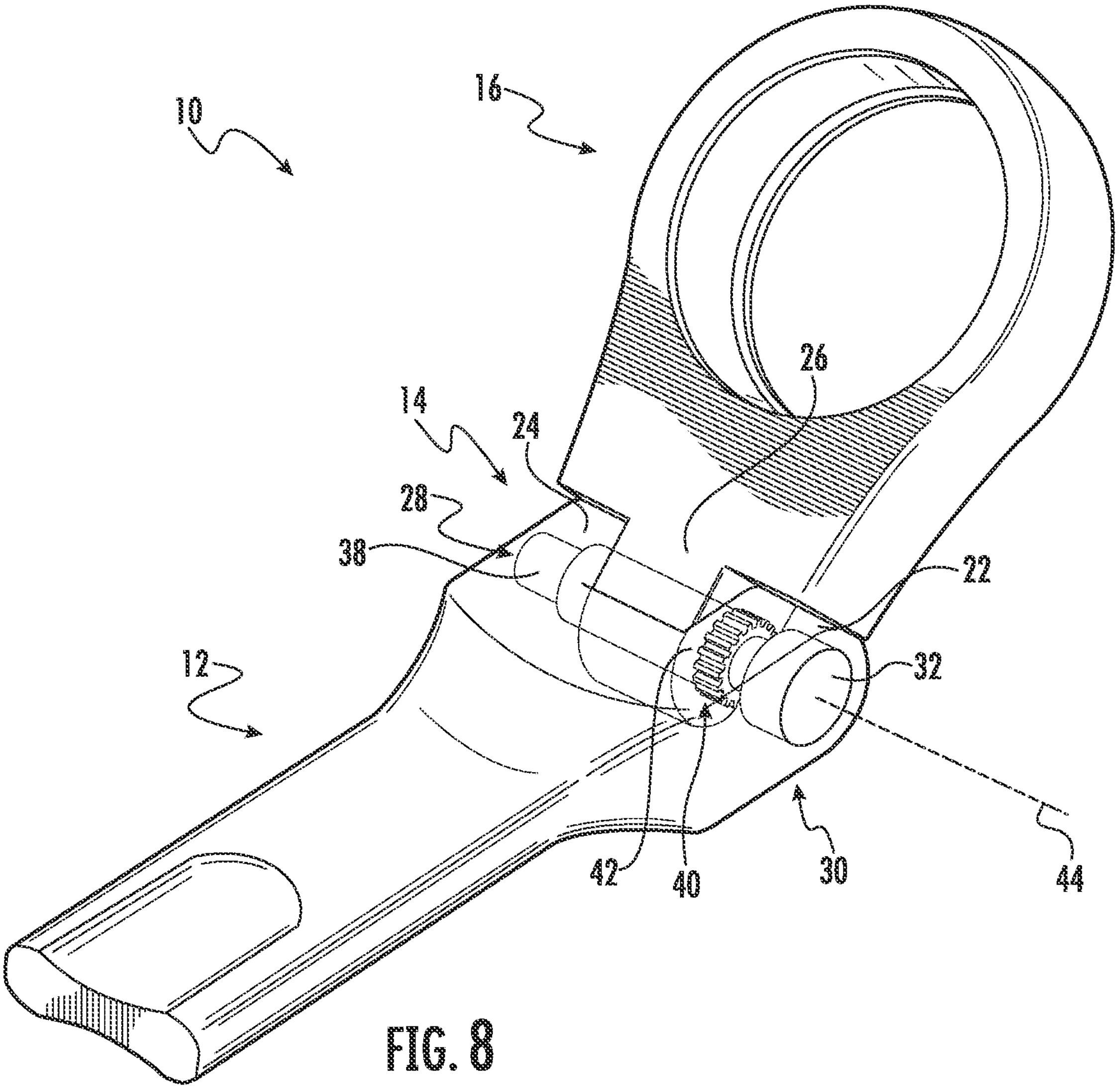
FIG. 8 is a side perspective view of the locking mechanism of the ratchet wrench of FIG. 1 in the locked position with the head pivoted, according to an exemplary embodiment.

Referring to FIG. 8, a side perspective view of the locking mechanism 30 of the wrench 10 in the locked position with the head 16 pivoted is shown according to an exemplary embodiment. When a user does not push actuating end 38 of pin 28, spring 34 which had been compressed pushes actuating end 38 back toward opening 29 of arm 24. The spring 34 extends along the axis of rotation 44 between the pin 28 and the end cap 32 such that the spring 34 provides a force that biases the pin 28 away from the end cap 32 toward engagement with the head 16. Splines 40 reengage with grooves 42 of channel 36 of projection 26 and/or grooves 50 of channel 46 of arm 22. This engagement between the channel 36, 46 grooves 42, 50 and the splines 40 of pin 28 locks the tool head 16 at the selected, pivoted angle.

Referring to FIGS. 9-15 and as discussed in greater detail below, Applicant has designed additional embodiments of a locking mechanism for a tool with a pivoting head that provides for robust locking operating, increased adjustability in tight spaces and decreased complexity (i.e., fewer components are necessary). In contrast to the tool with a pivoting head discussed herein, tools with pivoting heads typically include locking mechanisms including numerous components that are difficult and/or expensive to manufacture. In a specific embodiment, the design discussed here includes a locking mechanism with a slider or button that is a single piece or component. Further, tools with pivoting heads typically have problems in small or tight spaces because a user may have difficulty unlocking and pivoting the head and/or handle to use the tool. The design discussed here includes a locking mechanism that can be easily actuated allowing for use in more confined work environments. In a specific embodiment, the slider or button is accessible from both sides allowing for the tool to be unlocked and pivoted even in confined spaces.

Figure 9:
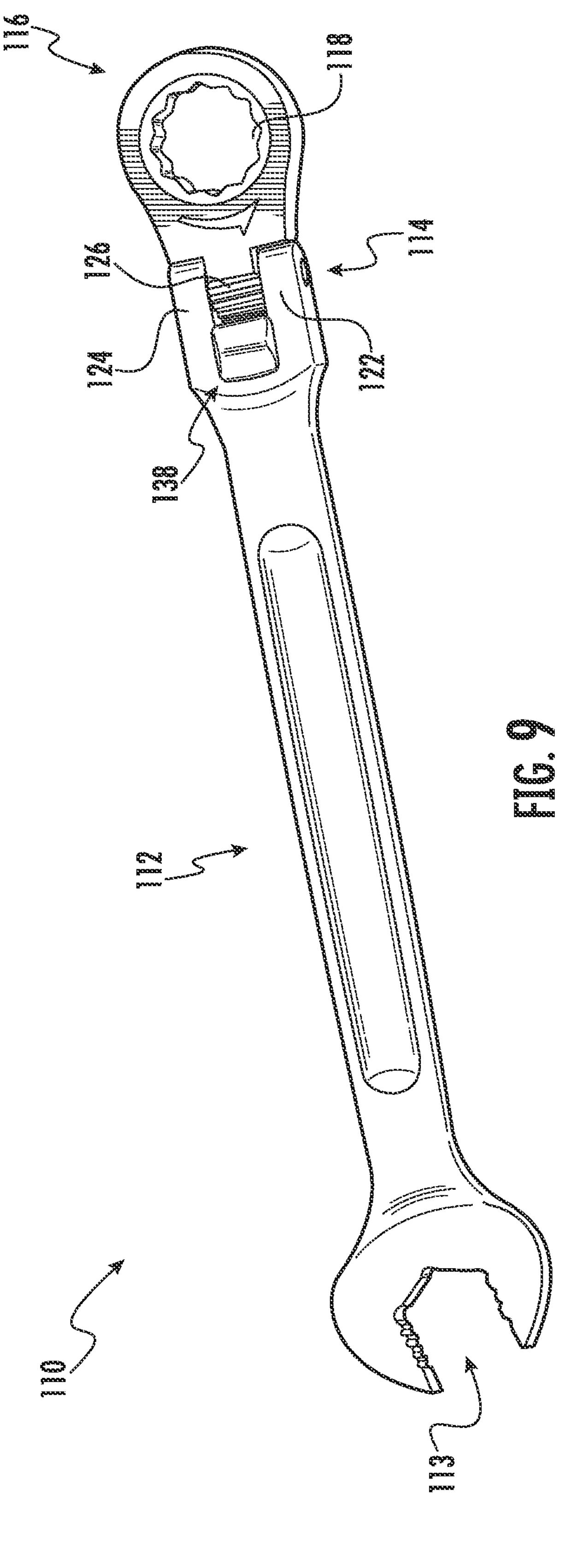
FIG. 9 is a perspective view of a ratchet wrench with a pivoting head, according to another exemplary embodiment.

Referring to FIG. 9, a tool, such as wrench 110, is shown according to an exemplary embodiment. In the embodiment shown, wrench 110 is a combination wrench including a tool handle 112, an open wrench end 113 and a ratchet head or end 116. Head 116 is formed from a generally ring-shaped portion of wrench 110 that surrounds and supports workpiece engagement surface 118. Wrench 110 further includes a pivot joint 114 located between handle 112 and head 116 and allows the user to change the angular position of head 116 relative to handle 112. Head 116 includes the workpiece engagement structure 118 (see e.g., FIG. 11) and a ratchet mechanism 120. Ratchet mechanism 120 is substantially the same as ratchet mechanism 20 except for the differences discussed herein. In a specific embodiment, ratchet mechanism 120 includes a gear structure, one or more pawls and one or more biasing components.

Figure 10:
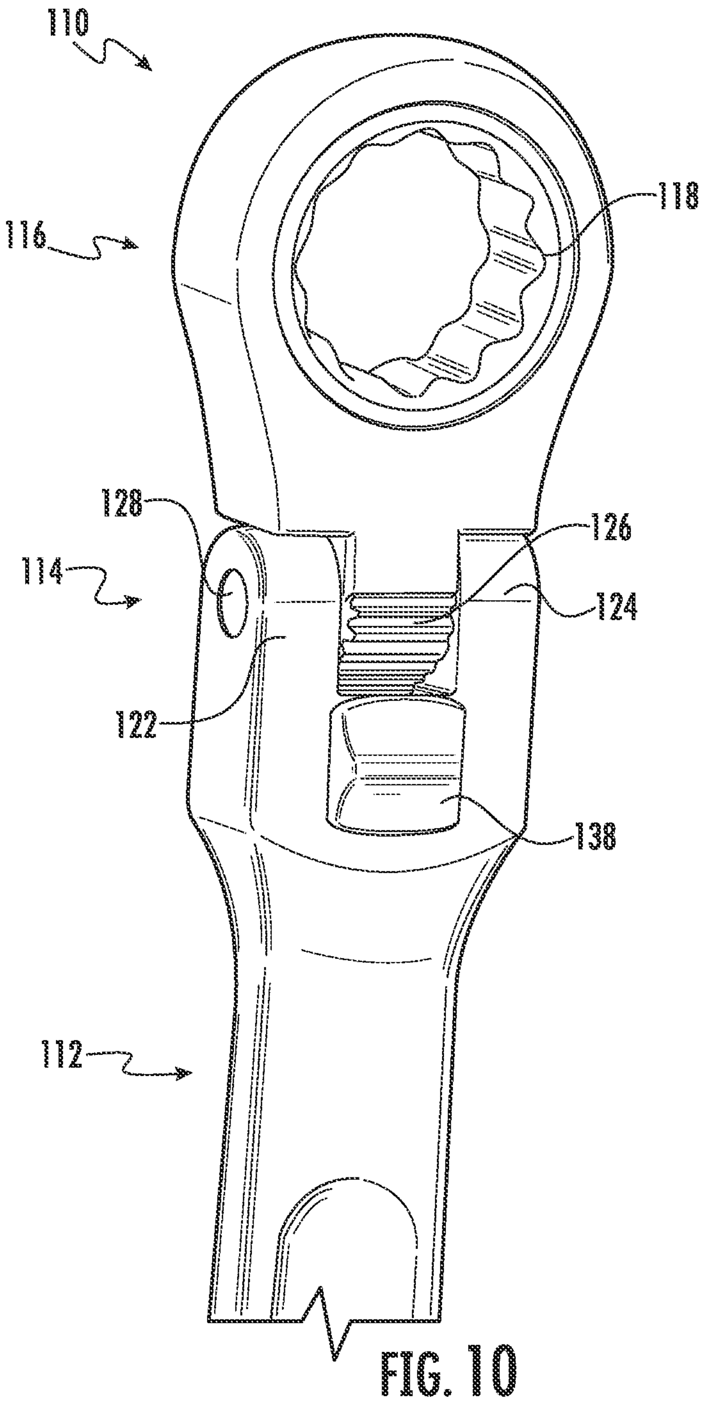
FIG. 10 is a rear perspective view of the pivoting head of the ratchet wrench of FIG. 9, according to an exemplary embodiment.

Referring to FIGS. 9-10, wrench 110 and specifically pivot joint 114 includes flanges or arms 122 and 124 located at an engagement end of handle 112 positioned proximate or adjacent to head 116. Head 116 includes a toothed projection 126 that is positioned between arms 122 and 124. Pivot joint 114 further includes an axle or fastener 128 extends through openings 129 through arms 122 and 124 and through toothed projection 126 such that fastener 128 rotatably couples head 116 to handle 112. In a specific embodiment, fastener 128 is socket head cap screw.

Wrench 110 includes a locking mechanism 130 that allows the user to selectably and reversibly lock head 116 in a desired angular position relative to the handle 112. Locking mechanism 130 is moveable between a locked position in which the angular position of head 116 relative to handle 112 is fixed and an unlocked position in which head 116 is pivotable about pivot joint 114. Locking mechanism 130 is controlled by a switching device or actuator, shown as sliding switch 138. In a specific embodiment, sliding switch 138 is a single component. In another specific embodiment, sliding switch 138 is integrally formed from one piece of material. In other words, sliding switch 138 is a single, integral component. In various embodiment, sliding switch 138 is formed from a metal material or a polymer material. Sliding switch 138 can be accessed and/or actuated on at least one side of handle 112. In a specific embodiment, sliding switch 138 can be actuated or accessed from both sides (i.e., upper and lower sides) of handle 112 allowing for use of locking mechanism 130 and pivotable head 116 in tight or confined spaces.

Figure 11:
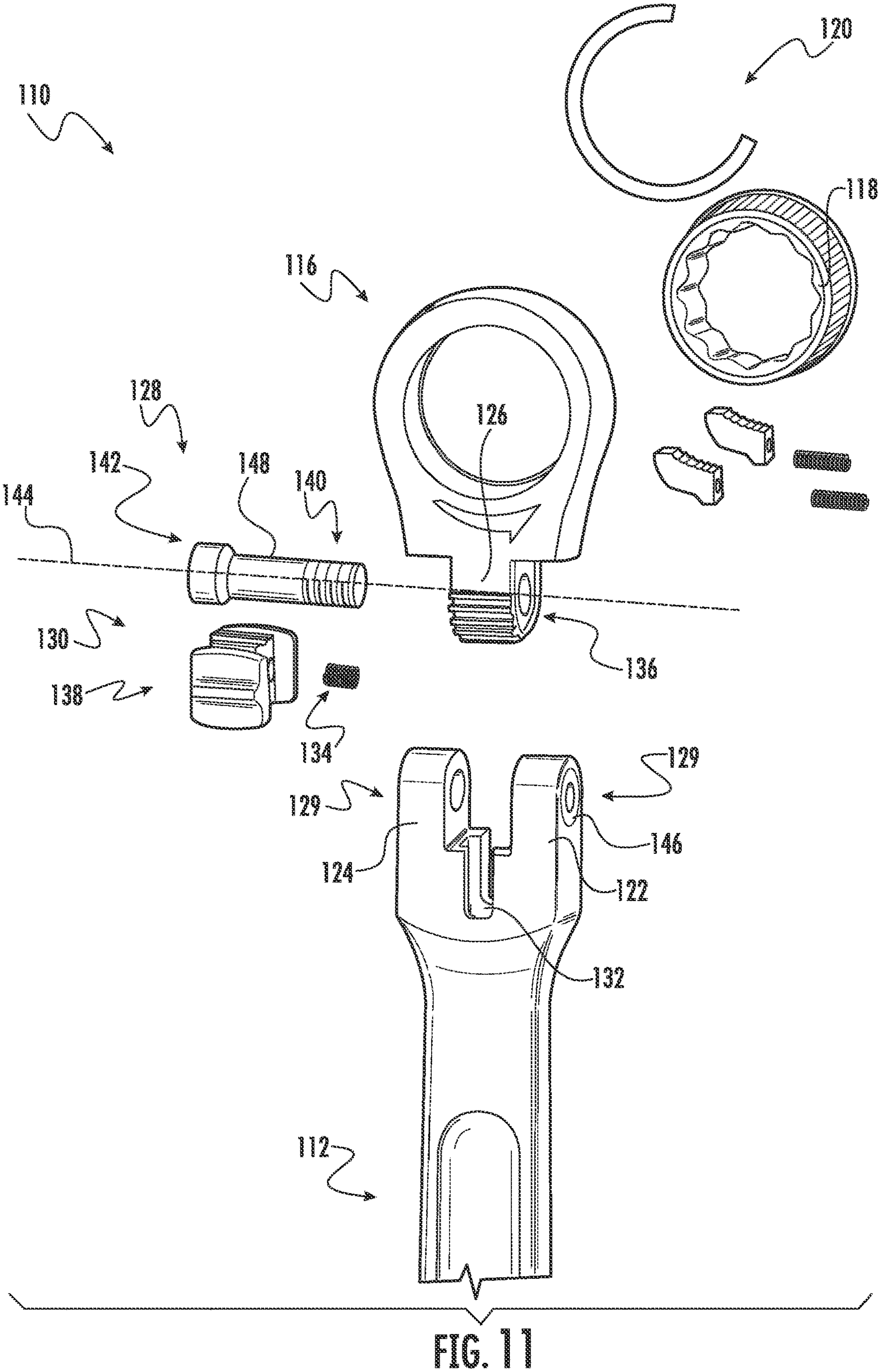
FIG. 11 is an exploded view of the ratchet wrench with the pivoting head of FIG. 9, according to an exemplary embodiment.

Referring to FIG. 11, an exploded view of wrench 110 is shown according to an exemplary embodiment. Locking mechanism 130 includes sliding switch 138, a biasing component, shown as spring 134, toothed projection 126, and a ball 164. Fastener 128 is positioned and extends along a pivot axis or axis of rotation 144. Head 116 pivots about pivot axis 144. Fastener 128 includes a pivot portion 148 positioned between a threaded end 140 and a socket cap end 142. When wrench 110 is assembled, threaded end 140 of fastener 128 is received with a channel 146 extending through arm 122. Channel 146 includes threading to couple fastener 128 to handle 112. As head 116 is pivoted, a channel 136 extending through toothed projection rotates or moves relative to pivot portion 148 of fastener 128.

Figure 12:
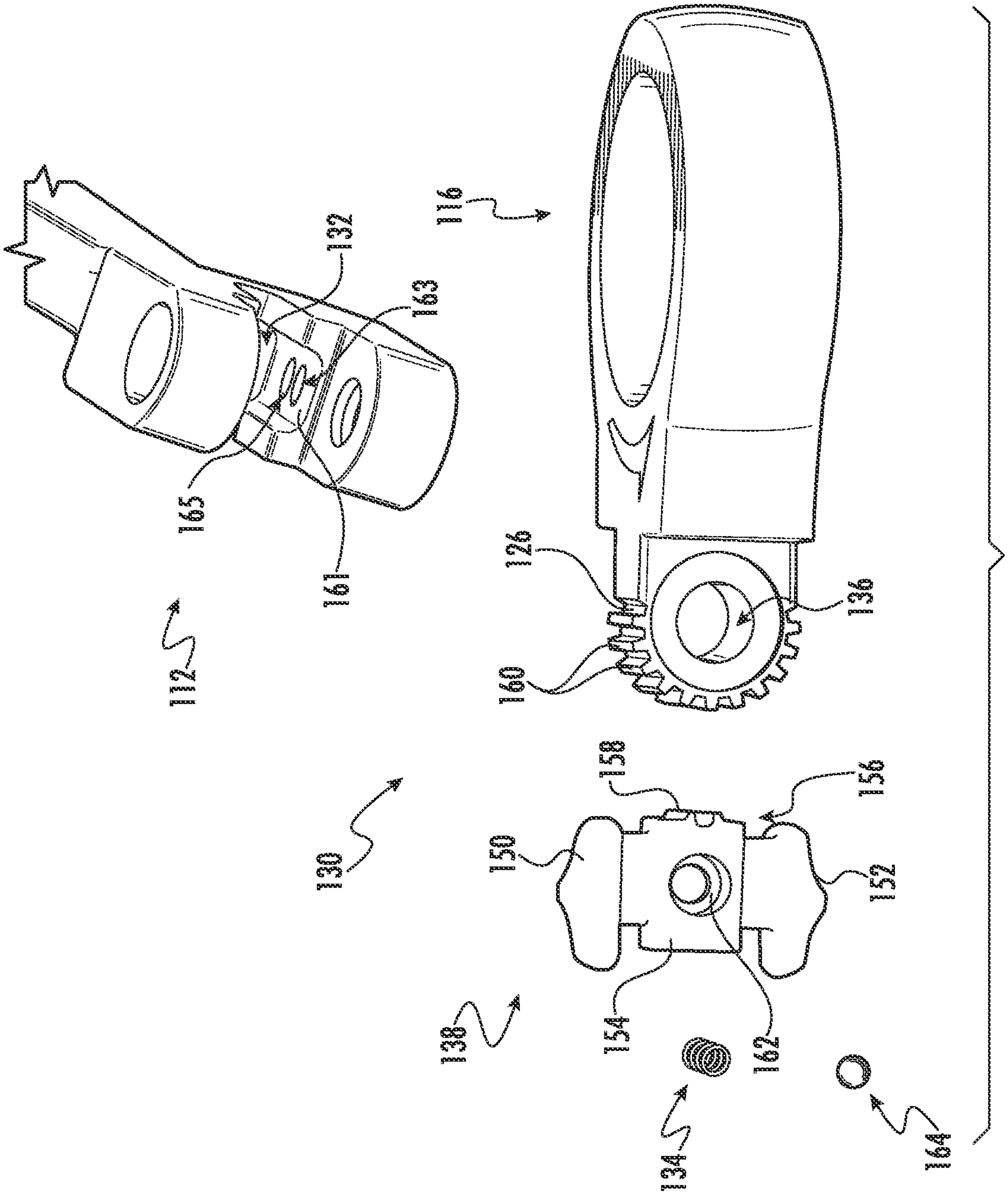
FIG. 12 is an exploded view of a locking mechanism of the ratchet wrench of FIG. 9, according to an exemplary embodiment.
Figure 13:
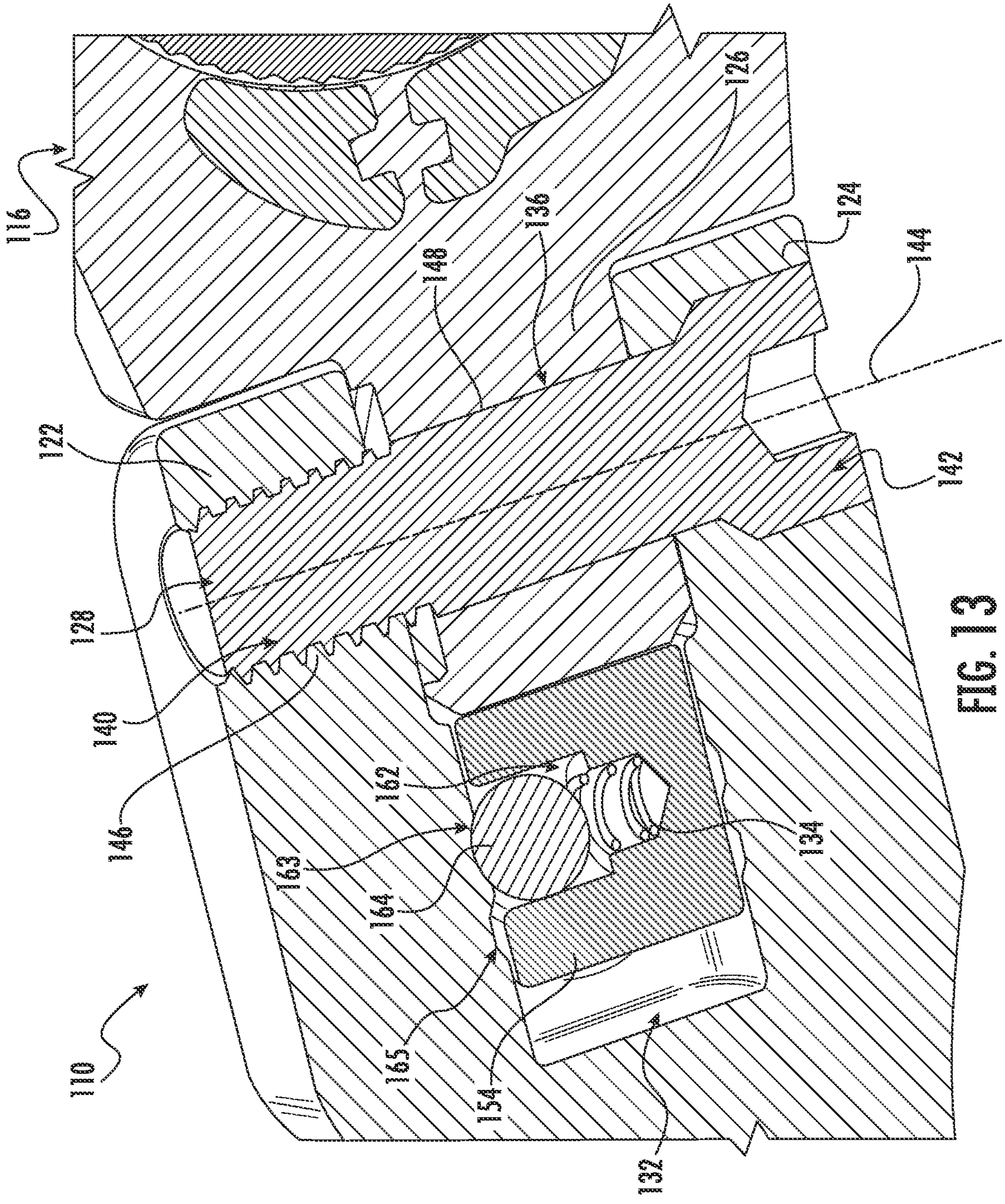
FIG. 13 is a cross-sectional view of the ratchet wrench with the pivoting head of FIG. 9 with the locking mechanism in a locked position, according to an exemplary embodiment.

Referring to FIGS. 12-13, details of locking mechanism 130 of wrench 110 are shown, according to an exemplary embodiment. In general, locking mechanism 130 is at least partially positioned within a cavity 132 in handle 112. Cavity 132 is positioned between arms 122 and 124. Sliding switch 138 includes an actuating surface 150 extending outward from handle 112 and configured to be pushed and/or engaged by a user's finger. In a specific embodiment, sliding switch 138 includes a second, opposing actuating surface 152 that extends outward from an opposing side of handle 112 from actuating surface 150 such that locking mechanism 130 can be accessed from either side of handle 112.

A body portion 154 of sliding switch 138 extends between and connects opposing actuating surfaces 150, 152. Body portion 154 includes an engagement portion 156 with a plurality of teeth 158. The plurality of teeth 158 extend toward and/or face toothed projection 126 and the plurality of teeth 160 on the toothed projection 126.

Body portion 154 further includes a locking channel 162 that extends in a generally parallel orientation (i.e., parallel plus or minus 10 degrees) to pivot axis 144. When locking mechanism 130 is assembled, spring 134 is positioned within locking channel 162 and extends in a generally parallel (i.e., parallel plus or minus 10 degrees) orientation to pivot axis 144. Ball 164 is at least partially received within locking channel 162 and configured to engage an end of spring 134 and a surface of handle 112. Specifically, at least one of arms 122 and 124 includes an inward facing surface 161 (i.e., facing longitudinal axis 174). Inward facing surface 161 includes a first or upper recess 163 and a second or lower recess 165. First recess 163 is positioned between head 116 and second recess 165. First and second recesses 163, 165 are configured to receive and engage ball 164. In other words, first and second recesses 163, 165 receive ball 164 such that first and second recesses 163, 165 resist movement of ball 164 and therefore resist movement of sliding switch 138.

In general, when wrench 110 is in an unlocked position and a user moves and/or pushes sliding switch 138 in a first, forward direction (i.e., towards head 116), ball 164 moves out of second recess 165 compressing spring 134 until ball 164 engages first recess 163 which allows spring 134 to expand and/or uncompress. When ball 164 is positioned within first recess 163, the plurality of teeth 158 of sliding switch 138 are positioned such that the teeth 158 engage with teeth 160 of toothed projection 126, locking or fixing head 116 in place. The first direction is generally perpendicular (i.e., 90 degrees plus or minus 10 degrees) to pivot axis 144.

When a user wants to pivot head 116, sliding switch 138 is moved in a second, rearward direction (i.e., away from head 116) opposite of the first direction. When sliding switch 138 is moved in the second direction, ball 164 moves out of first recess 163 compressing spring 134 until ball 164 engages second recess 165 which holds the sliding switch 138 in place (i.e., resists movement of sliding switch 138). In such a position, there is a gap or space between the plurality of teeth 158 of sliding switch 138 and the plurality of teeth 160 of toothed projection 126 such that head 116 is unlocked and pivotable.

Figure 14:
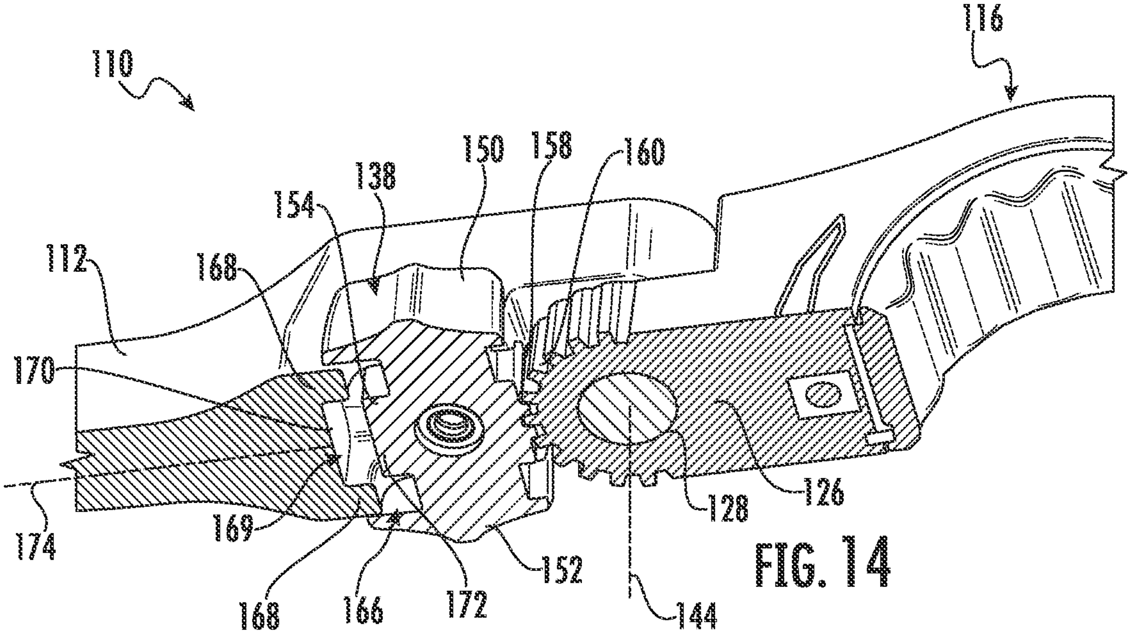
FIG. 14 is a cross-sectional view of the ratchet wrench with the pivoting head of FIG. 9 with the locking mechanism in a locked position, according to an exemplary embodiment.
Figure 15:
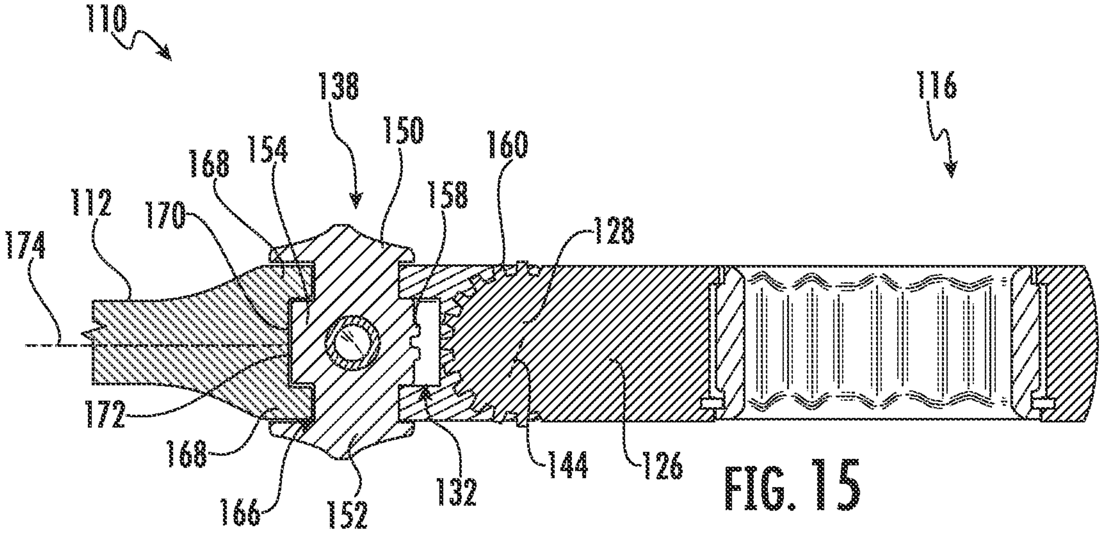
FIG. 15 is a cross-sectional view of the ratchet wrench with the pivoting head of FIG. 9 with the locking mechanism in an unlocked position, according to an exemplary embodiment.

Referring to FIGS. 14-15, cross-sectional views of wrench 110 are shown with locking mechanism 130 in a locked position and an unlocked position, according to an exemplary embodiment. As shown in FIG. 14, when locking mechanism 130 is in the locked position, teeth 158 are engaged with grooves between teeth 160 of toothed projection 126 such that head 116 is not pivotable and/or rotatable and spring 134 is in an uncompressed or extended state meaning sliding switch 138 is in a fixed position. Sliding switch 138 is moveable along a longitudinal axis 174 of wrench 110.

Sliding switch 138 further includes a recessed section 166. In various specific embodiments, sliding switch 138 includes a pair of recessed sections 166. Each recessed section 166 is positioned between an actuating surface 150, 152 and body portion 154. Handle 112 includes a projected portion 168 extending toward head 116, the projected portion 168 at least partially defines cavity 132. In various specific embodiments, handle 112 includes a pair or projected portions 168. Projected portion 168 extends between and connects flanges 122 and 124.

Handle 112 further includes a middle portion 169 recessed relative to projected portion 168. Middle portion 169 of handle 112 includes an upward facing (i.e., towards head 116) surface 170 that opposes a downward facing (i.e., towards handle 112) surface 172 of sliding switch 138 and/or body portion 154. When sliding switch 138 is in a locked position, a gap or space exists between downward facing surface 172 and upward facing surface 170 of handle 112.

When sliding switch 138 is actuated in the first or second direction, sliding switch 138 is translated along the longitudinal axis 174 of handle 112. As shown in FIG. 15, when locking mechanism 130 is in the unlocked position, teeth 158 are disengaged and/or spaced from the teeth 160 of toothed projection 126 such that head 116 is pivotable and/or rotatable and spring 134 is in an uncompressed or extended state meaning (i.e., sliding switch 138 is in a fixed position). In the unlocked position, projected portion 168 of handle is positioned within recesses 166 of sliding switch 138 such that the gap or space between downward facing surface 172 and upward facing surface 170 is reduced and/or removed.

Figure 16:
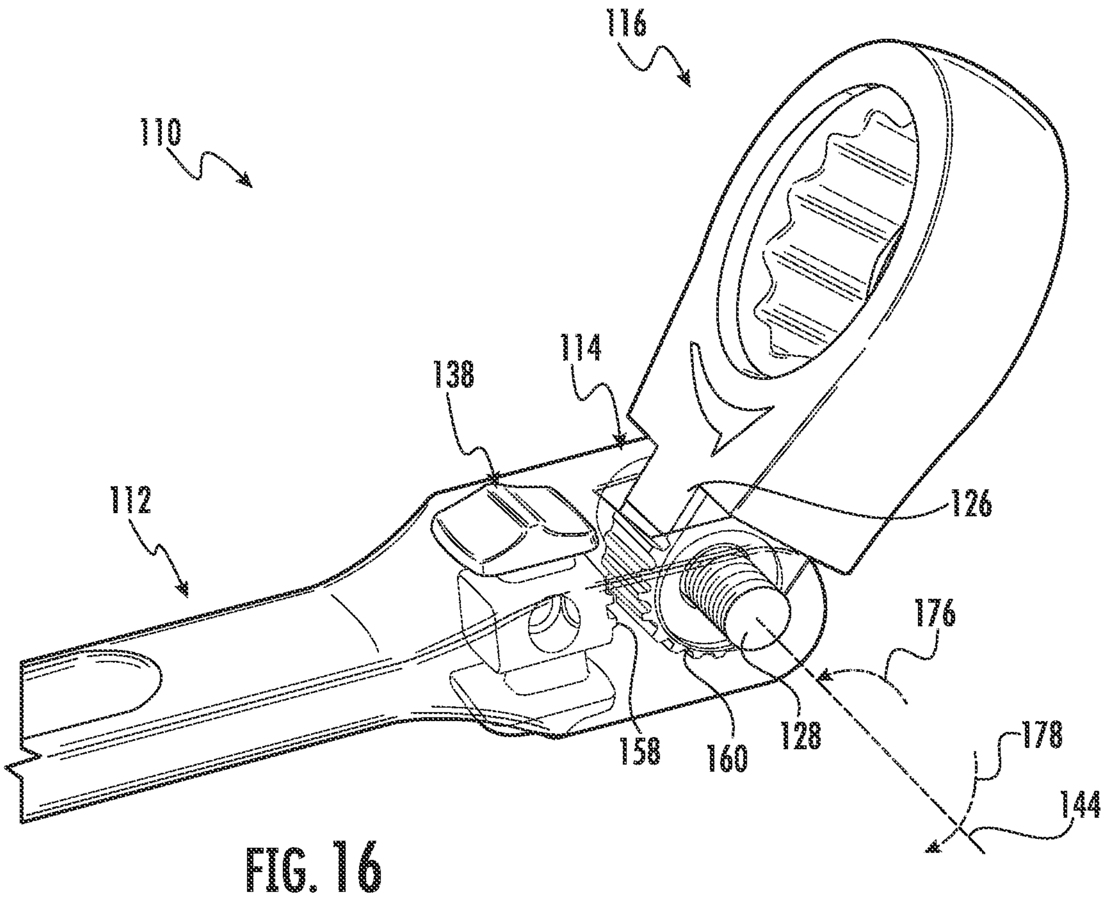
FIG. 16 is a side perspective view of the locking mechanism of the ratchet wrench of FIG. 9 in the unlocked position with the head pivoted, according to an exemplary embodiment.
Figure 17:
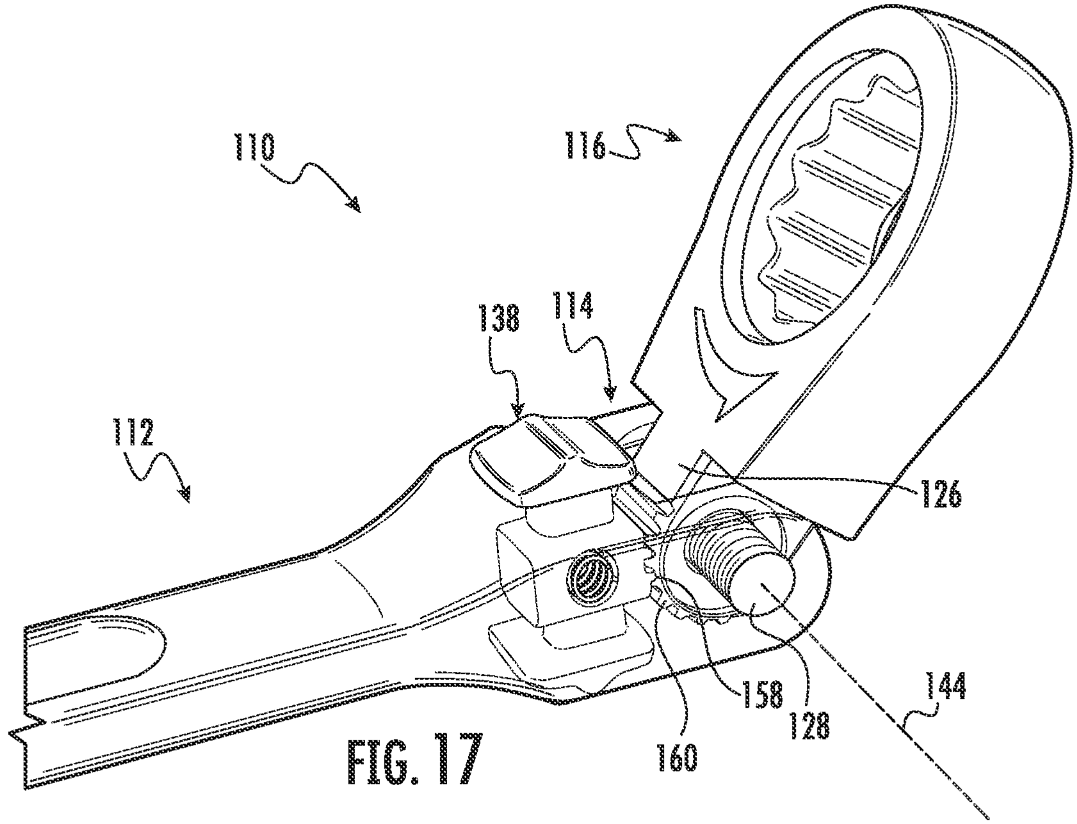
FIG. 17 is a side perspective view of the locking mechanism of the ratchet wrench of FIG. 9 in the locked position with the head pivoted, according to an exemplary embodiment.

Referring to FIGS. 16-17, side perspective views of the locking mechanism 130 of wrench 110 in the unlocked position (see e.g., FIG. 16) and the locked position (see e.g., FIG. 17) with the head 116 pivoted is shown according to an exemplary embodiment. Head 116 has been pivoted in a counterclockwise direction shown by arrow 176 such that the angle between head 116 and handle 112 has been reduced. Head 116 can similarly be pivoted in a clockwise direction, shown by arrow 178 such that the angle between head 116 and handle 112 is increased.

When locking mechanism 130 is moving between the unlocked position and the locked position spring 134 is compressed within locking channel 162. In other words, when ball 164 moves out of one of the first or second recess 163, 165, spring 134 is compressed until ball 164 is repositioned in the other of the first and second recesses 163, 165.

Figure 18:
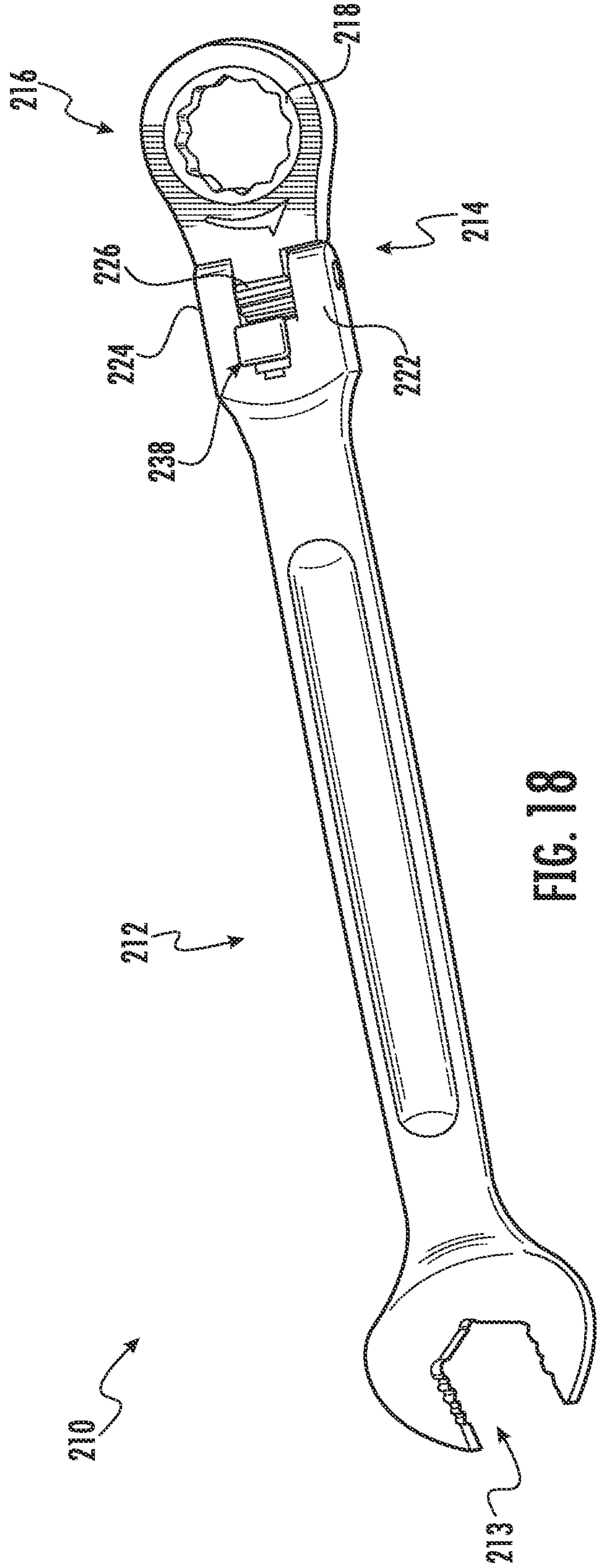
FIG. 18 is a perspective view of a ratchet wrench with a pivoting head, according to another exemplary embodiment.

Referring to FIG. 18, a tool, such as wrench 210, is shown according to an exemplary embodiment. Wrench 210 is substantially the same as wrench 110 except for the differences discussed herein. Applicant has designed a locking mechanism for a tool with a pivoting head that provides for secure locking (i.e., decreased likelihood of accidental actuation). In contrast to the tool with a pivoting head discussed herein, tools with pivoting heads typically include locking mechanisms that may be accidentally actuated (e.g., by bumping a switch, etc.). Applicant believes using a design with a push button switch and a receiver configured to engage the push button switch reduces the likelihood of accidentally actuating and unlocking the pivot head because the design discussed herein requires pushing the button downward and then sliding the button forward and/or pulling the button backward to lock and/or unlock the pivot head.

Figure 19:
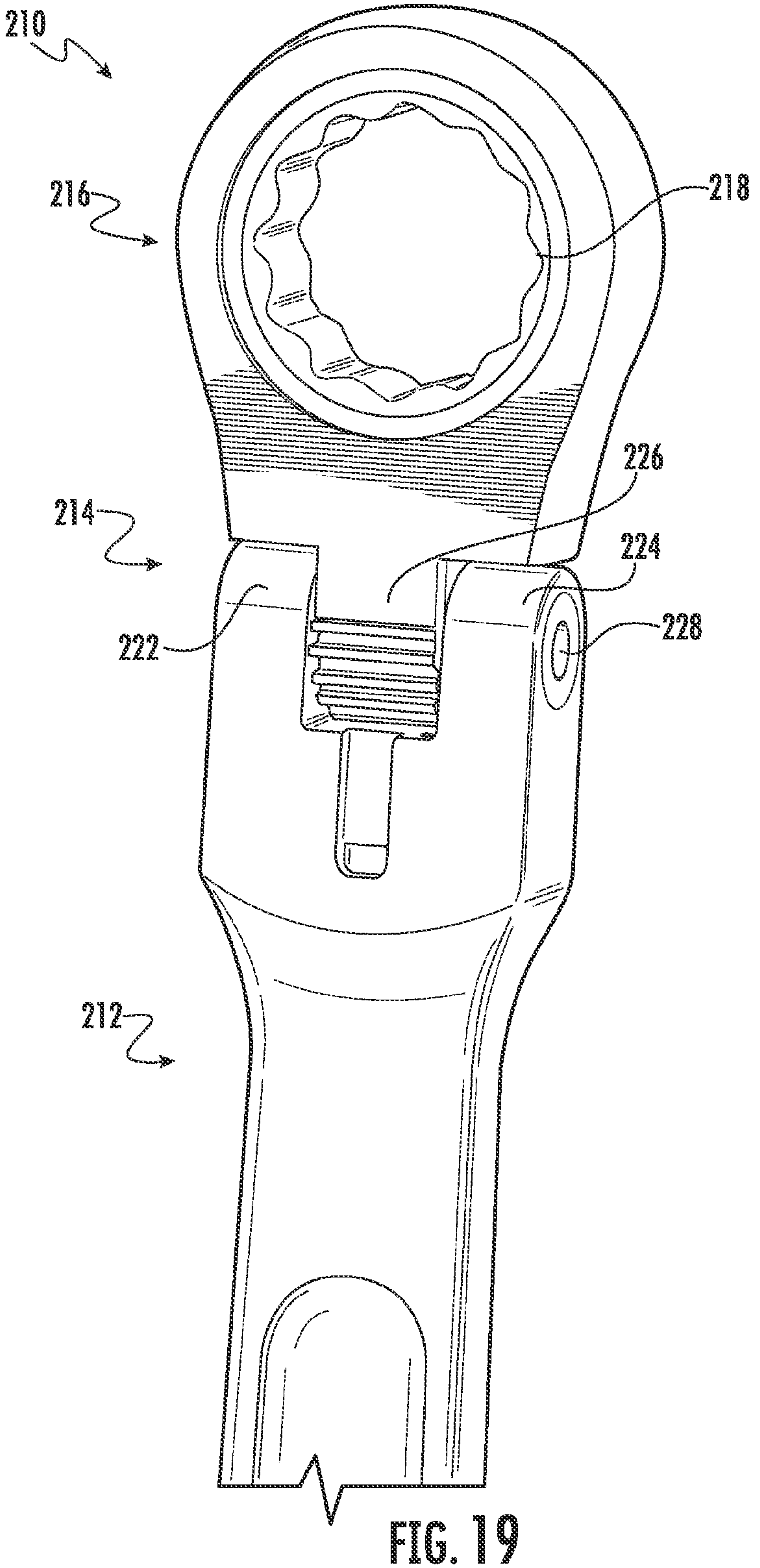
FIG. 19 is a rear perspective view of the pivoting head of the ratchet wrench of FIG. 18, according to an exemplary embodiment.

Referring to FIGS. 18-19, wrench 210 includes a locking mechanism 230 that allows the user to selectably and reversibly lock head 216 in a desired angular position relative to the handle 212. Locking mechanism 230 is moveable between a locked position in which the angular position of head 216 relative to handle 212 is fixed and an unlocked position in which head 216 is pivotable about pivot joint 214. Locking mechanism 230 is controlled by a switching device or actuator, shown as push button switch 238. As will be described in greater detail below, push button switch 238 includes a receiver 250 that engages head 216 and specifically toothed projection 226. Push button switch 238 can be accessed and/or actuated on one side of handle 212.

Figure 20:
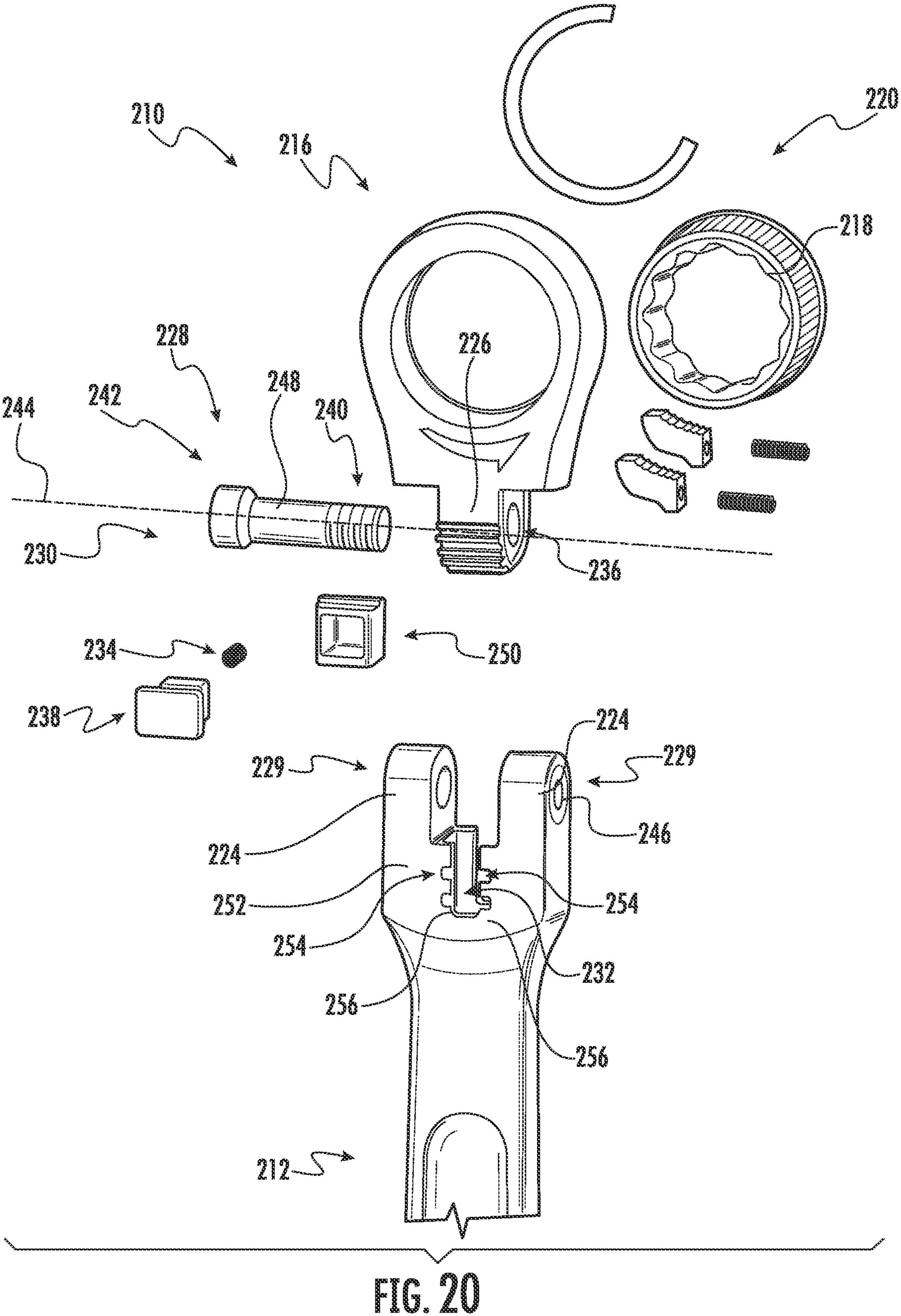
FIG. 20 is an exploded view of the ratchet wrench with the pivoting head of FIG. 18, according to an exemplary embodiment.

Referring to FIG. 20, an exploded view of wrench 210 is shown according to an exemplary embodiment. Locking mechanism 230 includes push button switch 238, a biasing component, shown as spring 234, toothed projection 226, and the receiver 250. Receiver 250 includes an open section 251 facing push button switch 238 and sized to receive a portion of push button switch 238.

Handle 212 includes an outer surface 252. Outer surface 252 includes a first pair of opposing notches 254 and a second pair of opposing notches 256. The first pair of opposing notches 254 are positioned between the second pair of opposing notches 256 and head 216. Each pair of opposing notches 254, 256 are positioned on opposite sides of cavity 232 from the opposing notch (i.e., one of each notch 254, 256 is positioned on each side of cavity 232).

Figure 21:
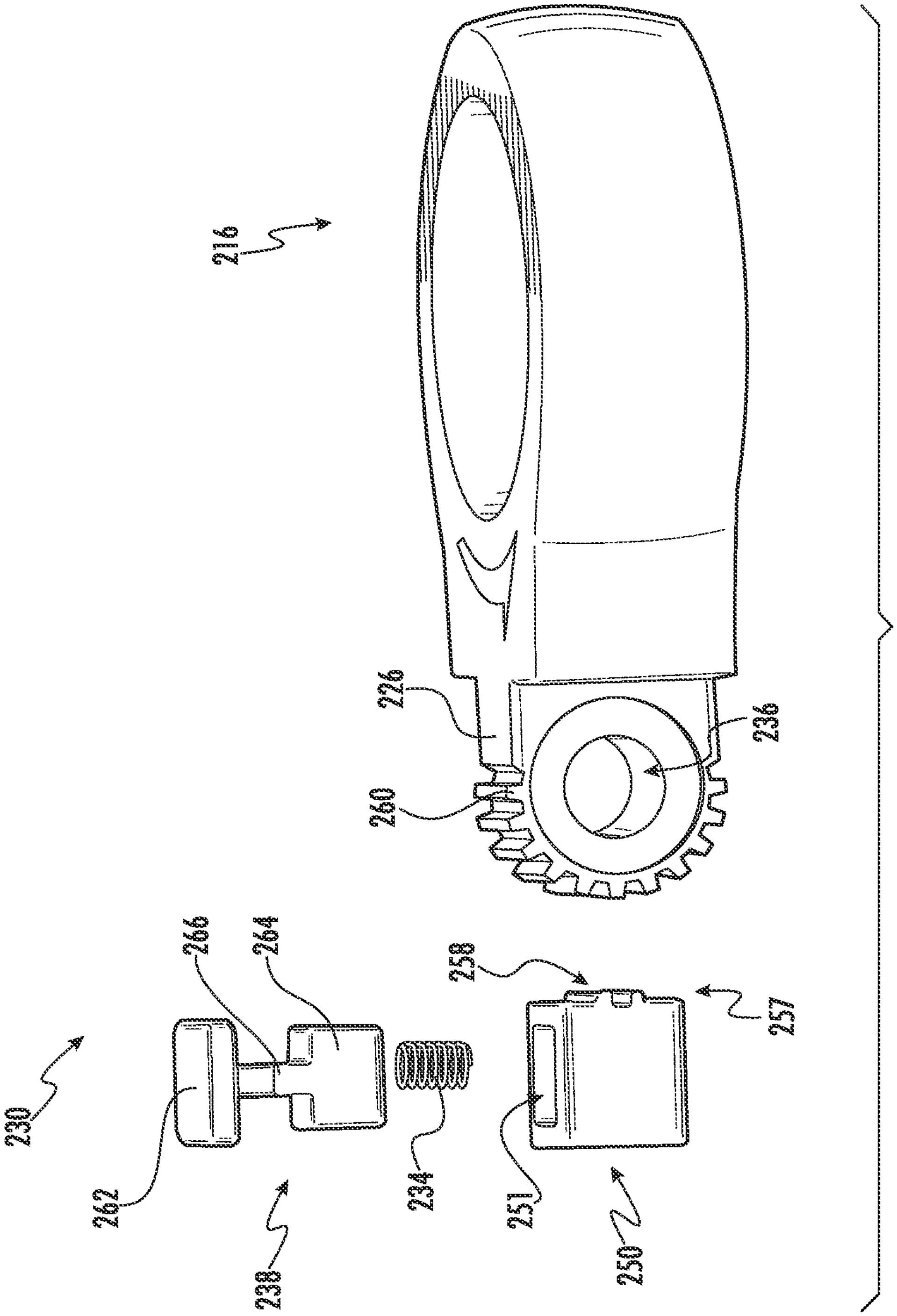
FIG. 21 is an exploded view of a locking mechanism of the ratchet wrench of FIG. 18, according to an exemplary embodiment.

Referring to FIG. 21, details of locking mechanism 230 of wrench 210 are shown, according to an exemplary embodiment. In general, locking mechanism 230 is at least partially positioned within a cavity 232 in handle 212. Push button switch 238 includes an actuating surface 262 extending outward relative to handle 212 and configured to be pushed and/or engaged by a user's finger. In a specific embodiment, actuating surface 262 is a planar or flat surface. Push button switch 238 further includes a body or engagement portion 264 that is positioned within receiver 250 when push button switch 238 is assembled. Spring 234 extends between and engages body portion 264 and an inner surface of open section 251 of receiver 250. In a specific embodiment, push button switch 238 includes a channel 276 that receives a portion of spring 234. Push button switch 238 further includes opposing projections 266. Opposing projections 266 extend in a generally parallel (i.e., parallel plus or minus 10 degrees) direction to pivot axis 244. Each of the opposing projections 266 is sized and/or configured to engage with the first pair of opposing notches 254 and/or the second pair of opposing notches 256 to hold or secure push button switch 238 in place relative to handle 212.

In general, when wrench 210 is in an unlocked position and a user pushes downward (i.e., toward outer surface 252) on push button switch 238, spring 234 is compressed and opposing projections 266 move downward from an engaged position with the second pair of opposing notches 256 to a disengaged position. A user can then move (i.e., translate) push button switch 238 in a first, forward direction (i.e., towards head 216), until opposing projections 266 are aligned with the first pair of opposing notches 254. A user can then release push button switch 238 which allows spring 134 to expand and opposing projections 266 are positioned such that the opposing projections engage with the first pair of opposing notches 254, locking or fixing push button switch 238 in place. In such a position, there is no gap or space between a plurality of teeth 258 on an engagement portion 257 of push button switch 238 and the plurality of teeth 260 of toothed projection 226, locking or fixing head 216 in place relative to handle 212. The first direction is generally perpendicular (i.e., 90 degrees plus or minus 10 degrees) to pivot axis 244.

When a user wants to pivot head 216, push button switch 238 can be compressed or pushed downward (i.e., toward outer surface 252) such that push button switch 238 can then be moved in a second, rearward direction (i.e., away from head 216) opposite of the first direction. When push button switch 238 is moved in the second direction, opposing projections 266 move from being aligned with the first pair of opposing notches 254 until opposing projections 266 are aligned with the second pair of opposing notches 256 that engage opposing projections 266 and/or push button switch 238 such that push button switch 238 is fixed and head 216 is rotatable. In such a position, there is a gap or space between the plurality of teeth 258 on engagement portion 257 of push button switch 238 and the plurality of teeth 260 of toothed projection 226 (i.e., no engagement).

Figure 22:
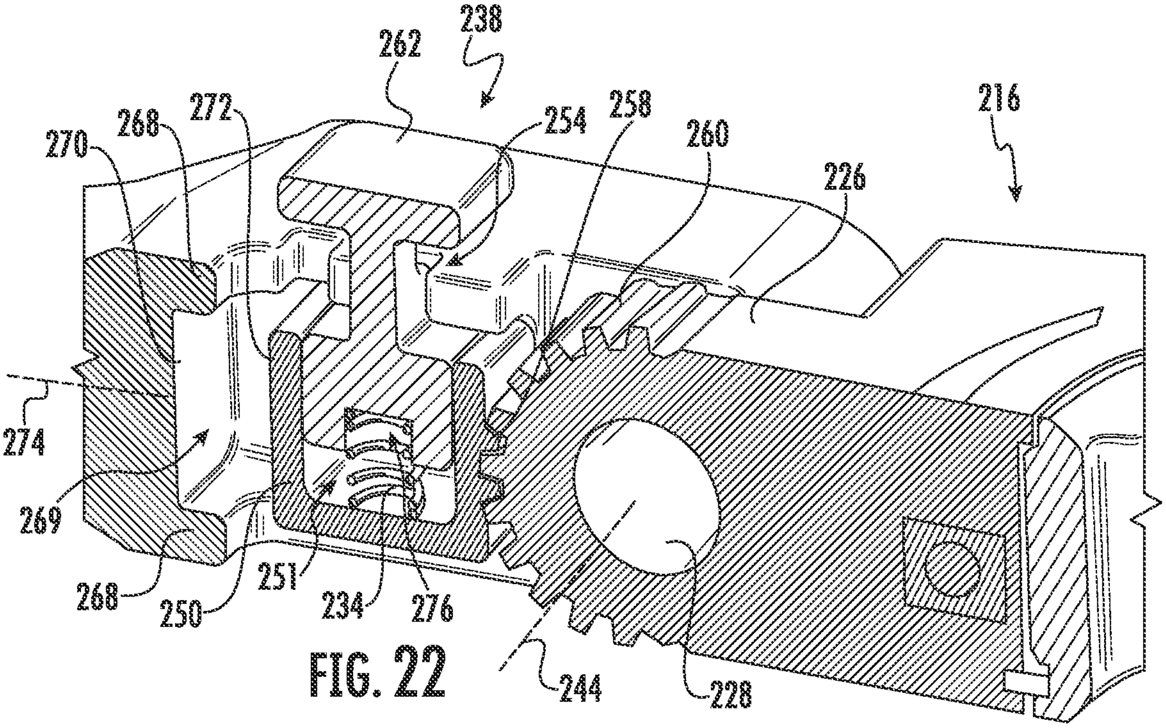
FIG. 22 is a cross-sectional view of the ratchet wrench with the pivoting head of FIG. 18 with the locking mechanism in a locked position, according to an exemplary embodiment.
Figure 23:
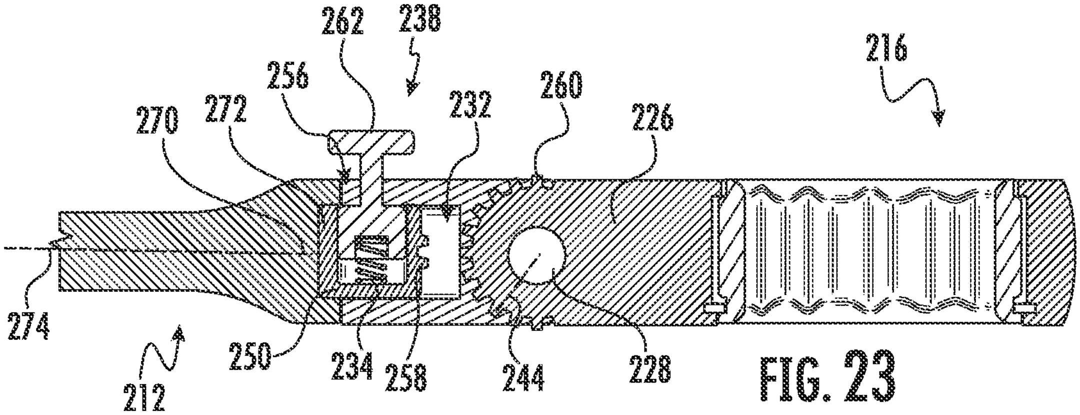
FIG. 23 is a cross-sectional view of the ratchet wrench with the pivoting head of FIG. 18 with the locking mechanism in an unlocked position, according to an exemplary embodiment.

Referring to FIGS. 22-23, cross-sectional views of wrench 210 are shown with locking mechanism 230 in a locked position and an unlocked position, according to an exemplary embodiment. As shown in FIG. 22, when locking mechanism 230 is in the locked position, teeth 258 are engaged with grooves between teeth 260 of toothed projection 226 such that head 216 is not pivotable and/or rotatable and spring 234 is in an uncompressed or extended state meaning push button switch 238 is in a fixed position due to engagement with the first pair of opposing notches 254.

Handle 212 and specifically cavity 232 includes projected portion 268 toward head 216. Handle 212 further includes a middle portion 269 recessed relative to projected portion 268. Middle portion 269 of handle 212 includes an upward facing (i.e., towards head 216) surface 270 that opposes a downward facing (i.e., towards handle 212) surface 272 of push button switch 238 and specifically receiver 250. When push button switch 238 is in a locked position, a gap or space exists between downward facing surface 272 and upward facing surface 270.

When push button switch 238 is actuated in the first or second direction, push button switch 238 is translated along the longitudinal axis 274 of handle 212. As shown in FIG. 23, when locking mechanism 230 is in the unlocked position, teeth 258 are disengaged and/or spaced from the teeth 260 of toothed projection 226 such that head 216 is pivotable and/or rotatable and spring 234 is in an uncompressed or extended state meaning push button switch 238 is in a fixed position. In the unlocked position, at least a portion of receiver 250 is positioned within middle portion 269 of handle 212 such that the gap or space between downward facing surface 272 and upward facing surface 270 is reduced and/or removed.

Figure 24:
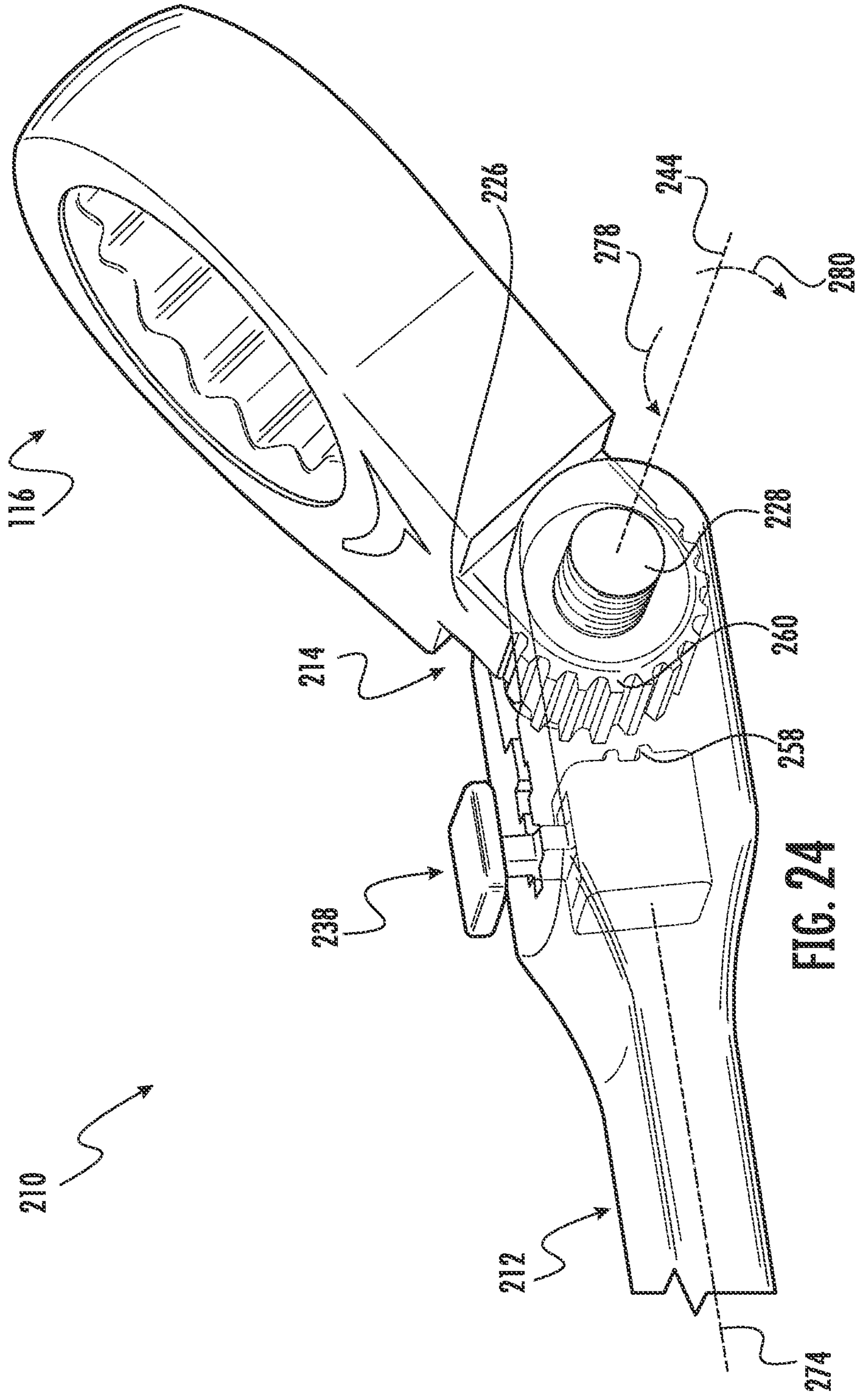
FIG. 24 is a side perspective view of the locking mechanism of the ratchet wrench of FIG. 18 in the unlocked position with the head pivoted, according to an exemplary embodiment.
Figure 25:
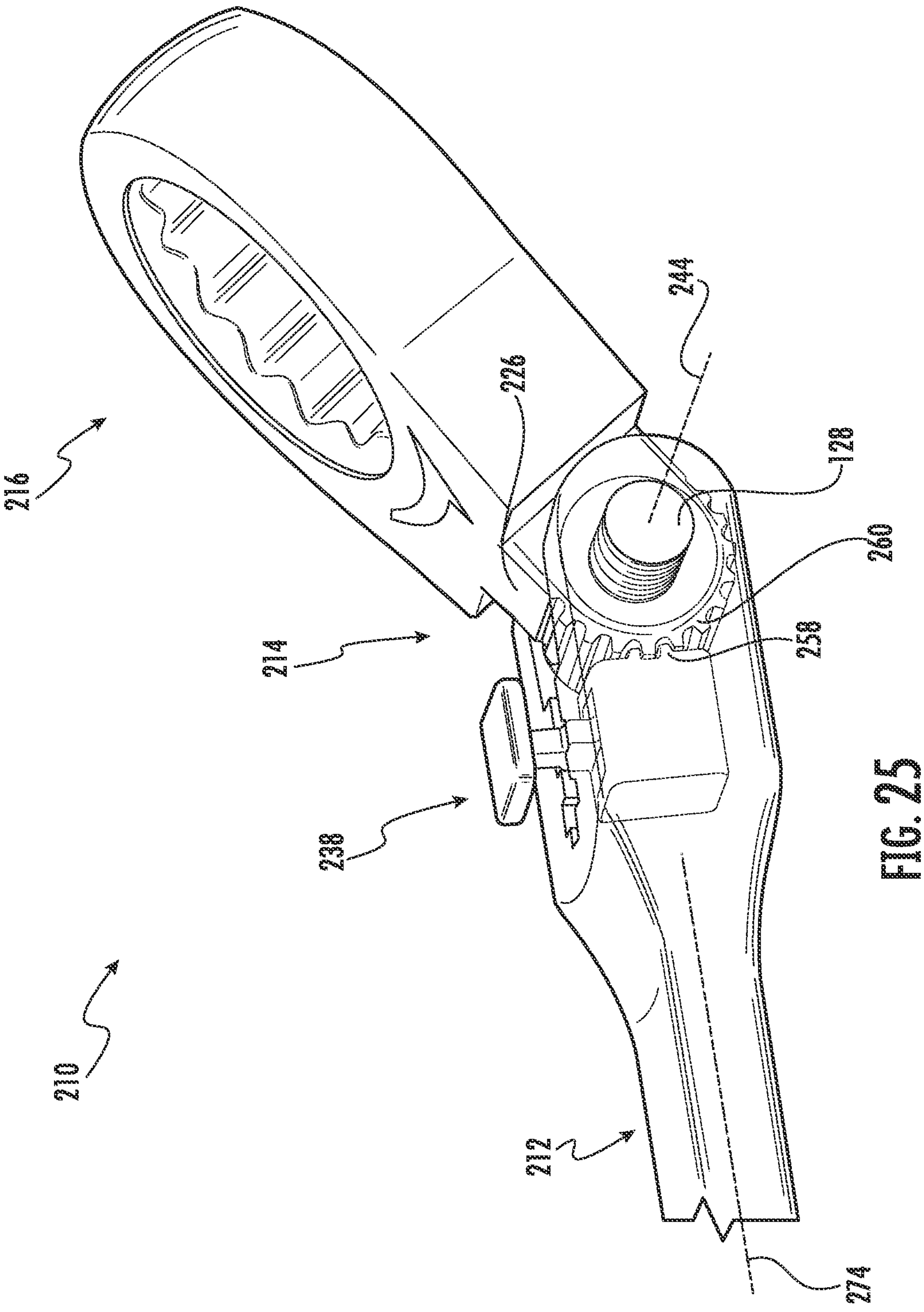
FIG. 25 is a side perspective view of the locking mechanism of the ratchet wrench of FIG. 18 in the locked position with the head pivoted, according to an exemplary embodiment.

Referring to FIGS. 24-25, side perspective views of the locking mechanism 230 of wrench 210 in the unlocked position (see e.g., FIG. 24) and the locked position (see e.g., FIG. 25) with the head 216 pivoted, is shown according to an exemplary embodiment. Ratchet head 216 has been pivoted in a counterclockwise direction shown by arrow 278 such that the angle between head 216 and handle 212 has been reduced. Head 216 can similarly be pivoted in a clockwise direction, shown by arrow 280 such that the angle between head 216 and handle 212 is increased.

It should be understood that while the disclosure herein relates primarily to ratchet wrenches, the locking member embodiments discussed herein can be used with a variety of tools with pivoting heads or other portions, such as handles.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. A driving tool, comprising:
- a handle comprising:
  - a first flange comprising an inward facing surface;
  - a first recess defined in the inward facing surface; and
  - a second recess defined in the inward facing surface, wherein the first recess is positioned between the second recess and the head;
  - a second flange; and
  - a cavity positioned between the first flange and the second flange;
- a head, the head including a toothed projection extending toward the handle;
- a workpiece engagement structure coupled to the head;
- a ratchet mechanism supported by the head and coupled to the workpiece engagement structure;
- a pivot joint positioned between the handle and the head, the pivot joint comprising:
  - an axle extending along a pivot axis, the axle rotatably coupling the head to the handle such that the head is pivotable about the pivot joint to a plurality of angular positions relative to the handle; and
- a locking mechanism positioned within the cavity, the locking mechanism comprising:
  - a sliding switch positioned within the cavity, the sliding switch comprising:
    - an actuating surface extending outward from the handle and configured to be engaged by a user's finger; and
    - a plurality of teeth facing the toothed projection of the head;
  - a biasing component extending in a generally parallel orientation to the pivot axis, the biasing component resisting movement of the sliding switch; and
  - a ball positioned between the biasing component and the inward facing surface of the first flange;
- wherein the locking mechanism is moveable between a locked position in which the angular position of the head relative to the handle is fixed and an unlocked position in which the head is pivotable about the pivot joint.

2. The driving tool of claim 1, the sliding switch further comprising a second, opposing actuating surface that extends outward from an opposing side of handle from the actuating surface such that locking mechanism is accessible from either side of the handle.

3. The driving tool of claim 2, the sliding switch further comprising a body portion extending between and connecting the actuating surface and the second actuating surface.

4. The driving tool of claim 3, wherein the body portion comprises a locking channel extending in a generally parallel orientation to the pivot axis.

5. The driving tool of claim 1, wherein the first recess and second recess each comprise an interior surface configured to engage the ball and resist movement of the ball.

6. The driving tool of claim 1, wherein the first recess and second recess are configured to receive the ball and resist movement of the sliding switch.

7. The driving tool of claim 1, wherein the sliding switch is a single, integral component.

8. A driving tool comprising:
- a handle comprising:
  - a first flange;
  - a second flange;
  - an inward facing surface of the handle positioned on one of the first flange and the second flange;
  - a first recess and a second recess positioned on the inward facing surface; and
  - a cavity positioned between the first flange and the second flange;
- a head, the head including a toothed projection extending toward the handle;
- a workpiece engagement structure coupled to the head;
- a pivot joint positioned between the handle and the head to rotatably couple the head to the handle such that the head is pivotable about the pivot joint to a plurality of angular positions relative to the handle;
- a pivot axis extending through the pivot joint, the pivot axis generally perpendicular to a longitudinal axis of the handle; and
- a locking mechanism positioned within the cavity, the locking mechanism comprising:
  - a switch positioned within the cavity, the switch comprising:
    - a first actuator extending outward from the handle and configured to be engaged by a user's finger; and
    - a plurality of teeth facing the toothed projection of the head;
  - a biasing component extending in a generally perpendicular orientation to the longitudinal axis of the handle, the biasing component resisting movement of the switch; and
  - a ball positioned between the biasing component and the inward facing surface of one of the first flange and the second flange;
  - wherein, when the switch is actuated, the switch is translated along the longitudinal axis of the handle;
  - wherein, when the switch is actuated toward the head, the biasing component is compressed such that the switch is moveable until the plurality of teeth engage the toothed projection of the head.

9. The driving tool of claim 8, wherein, when the switch is actuated toward the handle, the biasing component is compressed such that the switch is moveable until the switch engages an upward facing surface of the cavity.

10. The driving tool of claim 8, the switch further comprising a second, opposing actuator that extends outward from an opposing side of the handle from the first actuator.

11. The driving tool of claim 8, wherein, when the locking mechanism is in an unlocked position, the plurality of teeth are disengaged from the toothed projection of the head and the biasing component is in an uncompressed state.

12. The driving tool of claim 8, wherein, when the locking mechanism is in a locked position, the plurality of teeth are engaged with the toothed projection of the head and the biasing component is in an uncompressed state.

13. The driving tool of claim 8, wherein the first recess and the second recess are configured to receive the ball and resist movement of the ball.

14. A driving tool comprising:

a handle comprising:

a first flange;

a second flange; and a cavity positioned between the first flange and the second flange;

a head, the head including a toothed projection extending toward the handle;

a workpiece engagement structure coupled to the head;

a pivot joint positioned between the handle and the head to rotatably couple the head to the handle such that the head is pivotable about the pivot joint to a plurality of angular positions relative to the handle;

a pivot axis extending through the pivot joint, the pivot axis generally perpendicular to a longitudinal axis of the handle; and a locking mechanism, the locking mechanism comprising:

a switch, the switch comprising:

an actuator extending outward from the handle and configured to be engaged by a user's finger; and a body portion coupled to the actuator, the body portion comprising:

an upward facing surface, the upward facing surface facing toward the head;

a downward facing surface, the downward facing surface facing toward the handle;

a plurality of teeth on the upward facing surface of the body portion, the plurality of teeth extending toward the toothed projection of the head; and a locking channel defined in an outermost side surface of the body portion, the locking channel extending in a generally parallel orientation to the pivot axis;

a biasing component positioned in the locking channel and configured to resists movement of the switch; and a ball positioned between the biasing component and an inward facing surface of the handle;

wherein, when the switch is actuated, the switch is translated along the longitudinal axis of the handle.

15. The driving tool of claim 14, the switch further comprising a recessed section positioned between the actuator and the body portion, the recessed section facing toward the handle.

16. The driving tool of claim 15, the handle further comprising:

a projected portion extending toward the head; and a middle portion recessed relative to the projected portion, the middle portion including an upward facing surface that opposes the downward facing surface of the body portion;

wherein the projected portion of handle is positionable within the recessed section of the switch when the plurality of teeth are disengaged from the toothed projection of the head.

17. The driving tool of claim 14, wherein the biasing component extends in a generally perpendicular orientation to the longitudinal axis of the handle.

18. The driving tool of claim 14, wherein the locking channel circumferentially surrounds the biasing component.

19. The driving tool of claim 14, wherein the outermost side surface of the body portion faces the first flange.

* * * * *